United States Patent
Tu

(10) Patent No.: US 6,934,705 B2
(45) Date of Patent: Aug. 23, 2005

(54) DATA SORTING METHOD AND NAVIGATION METHOD AND SYSTEM USING THE SORTING METHOD

(75) Inventor: Ihung S. Tu, Anaheim, CA (US)

(73) Assignee: Alpine Electronics, Inc, Tokyo (JP)

( * ) Notice: Subject to any disclaimer, the term of this patent is extended or adjusted under 35 U.S.C. 154(b) by 185 days.

(21) Appl. No.: 10/217,250

(22) Filed: Aug. 12, 2002

(65) Prior Publication Data

US 2004/0030678 A1 Feb. 12, 2004

(51) Int. Cl.[7] .............................................. G06F 17/30
(52) U.S. Cl. ........................ 707/7; 707/104.1; 707/10; 701/201; 701/209; 701/211
(58) Field of Search ................. 707/104.1, 10, 707/7; 701/211, 209, 201

(56) References Cited

U.S. PATENT DOCUMENTS 6,278,940 B1 * 8/2001 Endo .......................... 701/209
6,321,158 B1 * 11/2001 DeLorme et al. ........... 701/201
6,484,094 B1    11/2002 Wako

FOREIGN PATENT DOCUMENTS

| JP | 10-030931   | 2/1998 |
| JP | 2001-050768 | 2/2001 |

OTHER PUBLICATIONS

Michael Main and Walter Savitch "Data Structures and Other Objects Using C++" pp. 620–629, 2001 Addison Wesley Longman, no date.

* cited by examiner

Primary Examiner—Charles Rones
(74) Attorney, Agent, or Firm—Muramatsu & Associates

(57) ABSTRACT

A computer-implemented data sorting method for sorting data at high speed with small memory capacity. The sorting method sorts an array of data where sorted data is constituted by a combination of a plurality of blocks where each block is produced separately from one another during the sorting process. In another aspect, a navigation method and system utilizes the data sorting method for quickly sorting and displaying requested information such as POIs sorted by distance with use of a small memory.

20 Claims, 18 Drawing Sheets

Sorted Buffer / Working Buffer

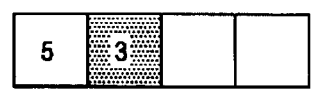

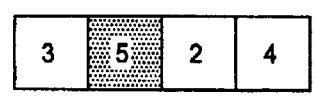

Sorted Buffer / Working Buffer

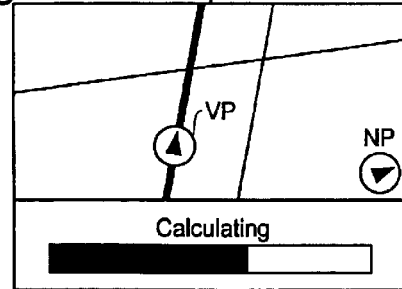

| | POI (A) | POI (B) | POI (C) | POI (D) | POI (E) | POI (F) | POI (G) | POI (H) | POI (I) | POI (J) | POI (K) | POI (L) | POI (M) | POI (N) | POI (O) | POI (P) |
|---|---|---|---|---|---|---|---|---|---|---|---|---|---|---|---|---|
| (1) | 15 | 7 | 5 | 9 | 12 | 10 | 6 | 8 | 14 | 18 | 11 | 13 | 4 | 16 | 3 | 19 |
| (2) | | | | | | | | | | | | | | | | |

Fig. 14B

| POI (O) | POI (M) | POI (C) |
|---|---|---|
| 3 | 4 | 5 |

Fig. 14C

| POI (G) | POI (B) | POI (H) |
|---|---|---|
| 6 | 7 | 8 |

Fig. 14D

| POI (D) | POI (F) | POI (K) |
|---|---|---|
| 9 | 10 | 11 |

Fig. 14E

| POI (E) | POI (L) | POI (I) |
|---|---|---|
| 12 | 13 | 14 |

Fig. 14F

| POI (A) | POI (N) | POI (J) |
|---|---|---|
| 15 | 16 | 18 |

DATA SORTING METHOD AND NAVIGATION METHOD AND SYSTEM USING THE SORTING METHOD

FIELD OF THE INVENTION

This invention relates to a data sorting method for sorting data at high speed with small memory capacity, and more particularly, to a sorting method for sorting an array of data where sorted data is constituted by a combination of a plurality of blocks where each block is produced separately from one another during the sorting process. The present invention also relates to a navigation method and system using the data sorting method for quickly sorting and displaying requested information with use of a small memory.

BACKGROUND OF THE INVENTION

Data sorting is important and often used in data processing systems as well as in consumer electronics products such as personal computers, facsimile, vehicle navigation systems and the like. In a navigation system, for example, a map data storage such as a DVD (digital versatile disc) stores map data including point of interest (POI) data showing a large number of places categorized by predetermined groups. Examples of category of POIs include ATM, bank, restaurant, gas station, supermarket, and the like.

When a user requested to see a specific type of POIs such as restaurant, a navigation system displays a list of restaurants sorted by distance from a particular position, typically, a current user (vehicle) position. Since a large number of POIs, for example as many as 1,000 POIs, have to be sorted at the same time, the navigation system takes a relatively long time, such as from several to ten seconds or more before displaying the results.

Data sorting is conducted by a computer system such as shown in FIG. 1. In this example, the computer system is comprised of a bus 11 for transfer of data and address, a main memory 12 for storing programs, a processor 13 for executing a program, an input device such as a keyboard 15, a buffer memory 17 for temporary storing data, and a display 18. The sorting method of the present invention is implemented by such a computer system.

There are a large number of known sorting procedures. Generally, when sorting an array of data having a large number of entries, a buffer memory of a large capacity corresponding to such a large number of entries is required for the sorting procedure. Further, to complete the data sorting within a short time, a processor must be capable of high speed operation.

FIGS. 2A–2C are schematic diagrams respectively showing an example of prior art technology which includes an array of input data, a buffer memory used for the sorting procedure, and an array of sorted data. This example shows a case where input data with a large number of entries has to be sorted at the same time, i.e., an overall sorted result has to be produced at the same time. The array of input data in FIG. 2A has ten entries each being provided with a number.

In the case where such entries are POIs (point of interest) data used for a navigation system, the number of each entry represents, for example, a distance of each POI from a particular position, such as a current vehicle position. The data array of FIG. 2C is the result of sorting process where the elements in the data array of FIG. 2A are sorted from the smallest number (ex. shortest distance) to the largest number (ex. longest distance).

To sort the input data of FIG. 2A, the input data has to be stored in the buffer memory of FIG. 2B and data comparison of a large number of times has to be repeated during the sorting procedure. The buffer memory must have sufficient capacity to store the array of input data as a whole. For example, in the case of sorting the POIs information involved in the navigation system, where the number of POIs is as large as 1,000, the buffer memory having a memory capacity of at least 1,000 storage locations must be used. Further, to process such a large size of data by performing a large number of comparison, the sorting procedure takes a long time.

When a number of entries in the input data is N, and if the input data is sorted by a Quick Sort, one of the most commonly used sorting methods, it is proven that it requires the following number of data comparison:

Comparison (average)=$N\ln(N)$

Comparison (worst case)=$N(N-1)/2$ where ln is the natural logarithm.

Thus, when N is 1,000, the number of comparison is about 6,900 in the average case. In the worst case (input list is in the reverse order of the final result of sorting), the number of comparison is about 500,000. Accordingly, the conventional sorting method requires a long processing time as well as a buffer memory of large memory capacity. Therefore, there is a need for a new data sorting method which can sort the data quickly without requiring a large size buffer memory and/or a high speed processor.

SUMMARY OF THE INVENTION

It is, therefore, an object of the present invention to provide a data sorting method which is capable of sorting data in an array of input data at high speed with use of a small memory.

It is another object of the present invention to provide a data sorting method which is capable of producing a series of blocks each having data entries sorted by a predetermined order.

It is a further object of the present invention to provide a navigation method and system which incorporating the sorting method of the present invention for sorting POI (point of interest) data at high speed with use of a small memory.

It is a further object of the present invention to provide a navigation method and system for quickly and accurately retrieving and sorting an amount of POI data sufficient for a current display size and immediate display scrolls.

The first aspect of the present invention is a data sorting method for sorting an array of input data in a specified order to a plurality of blocks. The sorting method is comprised of the steps of:

(a) defining a number of data entries A for each block when the input data array has N entries and a total number of blocks is N/(X−B), where X is smaller than N;

(b) creating a buffer of X entries configured by a series of a sorted buffer of A entry positions and a working buffer of B entry positions, where X=A+B;

(c) defining "previous high" and a reference entry where the previous high is a highest value in a block of sorted entries obtained in an immediately previous sorting and the reference entry is a value in a last entry position of the sorted buffer;

(d) searching an entry that satisfies conditions of (1) larger than the previous high and (2) smaller than the reference entry and loading the entry that satisfies the conditions in the sorted buffer;

(e) sorting the entries in the sorted buffer in a forward order when the sorted buffer is full;

(f) searching an entry that satisfies conditions of (1) larger than the previous high and (2) smaller than a new reference entry and loading the entry that satisfies the conditions in the working buffer;

(g) sorting the entries in the buffer in the forward order when the buffer is full;

(h) repeating the above steps (f)–(g) until no entry satisfies the conditions in the step (f); and (i) producing a block of sorted entries by taking the entries A from the sorted buffer.

For producing all of the blocks of sorted entries, the data sorting method further includes a step of determining whether all the blocks of sorted entries are produced, and if not, repeating the steps (c)–(i) until all the blocks of sorted entries are produced. In the sorting method noted above, the new reference entry is a value in the last entry position of the sorted buffer after the sorting step (e) or the sorting step (g), thereby collecting an entry of smallest value from the input data array. Further, an initial value of the reference entry in the step (c) is a maximum value larger than any entry in the input data array.

In the present invention, sorting in the reverse order is also possible by using the conditions opposite to that of the forward order. Namely, the conditions in the reverse order sorting are whether an entry is (1) smaller than a "previous low" and (2) larger than a reference entry. The previous low is a smallest value in a block of sorted entries obtained in the immediately previous sorting and the reference entry is a value in the last entry position of the sorted buffer.

Another aspect of the present invention is a navigation method for displaying point of interest (POI) information for selecting a destination by incorporating the data sorting method noted above.

The navigation method is comprised of the steps of: specifying a category of POI in a navigation system for displaying a list of specified POIs, collecting a predetermined number (N) of POIs in an input data array, defining a number A of POIs to be contained in each block to produce a series of blocks each having the sorted POIs where X=A+B and is smaller than N and a total number of blocks is N/(X−B), sorting the POIs by distance from a predetermined position in a forward order or a reverse order to produce a block of POIs sorted by distance where each block has A POIs, displaying a list of POIs using the block of POIs sorted by distance and scrolling the list of POIs on a display screen in response to a scroll request; and repeating the above steps of sorting the POIs and displaying the POIs to produce another block of sorted POIs when the sorted POIs from previous sorting become insufficient for a further scroll request.

A further aspect of the present invention is a navigation system configured by various means for achieving the navigation method described above and performing the data sorting method of the present invention which produces one or more blocks of POIs sorted by distance where each block has only a limited number of POIs sufficient to be displayed on a display screen in a practical use of a navigation system.

According to the present invention, the data sorting method can dramatically reduce the sorting time and the memory size for sorting the array of input data. Each block having the sorted data therein is continuously produced until all blocks of sorted data are produced. The navigation method and system utilizes the sorting method of the present invention thereby enabling to produce one or more blocks of small amount of POIs sorted by distance which is immediately necessary for a practical use of the navigation system.

Accordingly, the navigation method and system is able to quickly sort and display the POI information without requiring a large memory or a high power computer. When it is necessary, the navigation method and system repeats the sorting operations to produce the next block of sorted POIs. Therefore, the present invention can provide a navigation system with high speed operation and low cost.

BRIEF DESCRIPTION OF THE DRAWINGS

FIGS. 2A–2C are schematic diagrams showing a conventional data sorting method in which FIG. 2A shows an array of input data, FIG. 2B shows a buffer memory used for the sorting procedure, and FIG. 2C shows an array of resultant sorted data.

FIG. 3A shows an array of input data, FIG. 3B shows a structure of buffer memory used for the sorting procedure, FIG. 3C shows blocks produced in series each carrying the sorted result, FIG. 3D shows the final sorted result, and FIG. 3E shows the final sorted result in a reverse order.

FIG. 9A is a main menu, FIG. 9B is a destination set menu and FIG. 9C shows a key board display for entering the destination.

FIGS. 10A–10H are schematic diagrams of display example showing a process of specifying the destination in the navigation system with use of a "Point of Interest (POI)" input method.

FIGS. 13A–13L are diagrams showing an example of process where the sorting method of the present invention is applied to the navigation system for sorting the points of interest (POIs) data by distance.

FIGS. 14A–14F are diagrams showing the input data before sorting (FIG. 14A) and the sorted results (FIGS. 14B–14F) in accordance with the sorting method of the present invention shown in FIGS. 13A–13L.

DETAILED DESCRIPTION OF THE INVENTION

The data sorting method of the present invention will now be described in more detail with reference to the accompanying drawings. Further, a navigation system using the data sorting method of the present invention is also descried in detail with reference to the accompanying drawings. While the present invention will be described in conjunction with a vehicle navigation system, it will be understood that the present invention is not limited to such a specific application. For example, the present invention can also be applicable to a portable (hand-held) navigation system, a portable data terminal such as a personal digital assistant (PDA), a lap top computer with a navigation function, and the like.

Figure 3A:
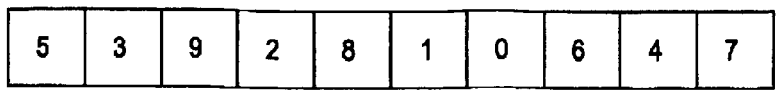
FIGS. 3A–3E are schematic diagrams showing basic concept of the data sorting method of the present invention where
Figure 3B:
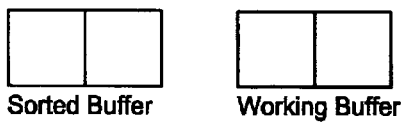
Figure 3C:
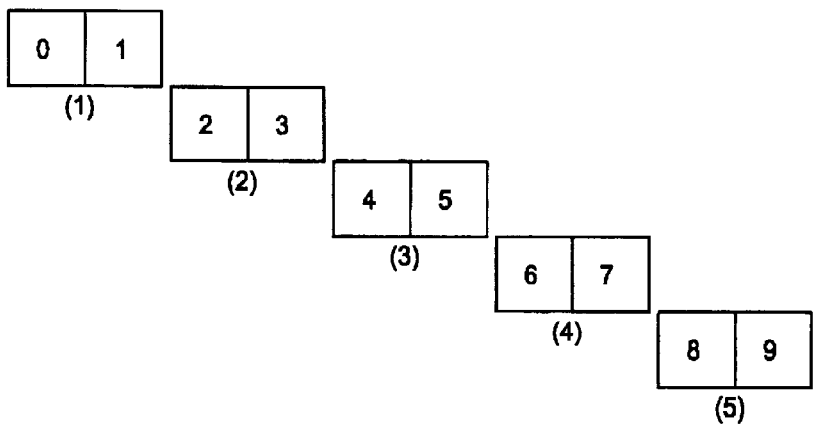
Figure 3D:
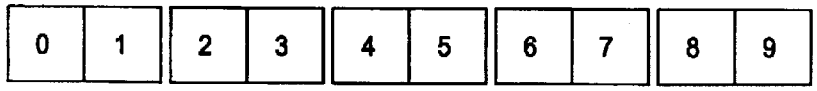
Figure 3E:
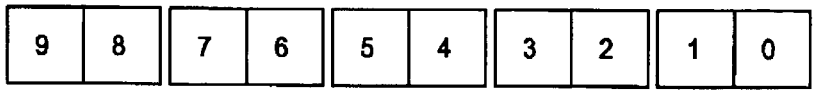

In the data sorting method of the present invention, the input data is sorted to a series of small blocks where each block shows a portion of the overall sorted result. The data sorting process for one block is conducted by using the sorted result of a previous block. FIGS. 3A–3E show the basic concept of the data sorting method of the present invention. FIG. 3A shows an array of input data, FIG. 3B shows a structure of buffer memory used for the sorting procedure, FIG. 3C shows blocks of sorted result produced in series, FIG. 3D shows the final sorted result, and FIG. 3E shows the final sorted result in the order opposite to that of FIG. 3D.

In an actual application of the data sorting, a device using such a data sorting process does not always need a complete and total results at a time, but rather a portion of the sorted result is sufficient if the portion of sorted result can be obtained at high speed. The data sorting method of the present invention is especially useful for such an application.

For example, in a navigation system, the inventor has discovered that since the display screen of the navigation system is limited to display only several to ten POI entries, it is unnecessary to prepare a large number of entries such as several hundred or one thousand POIs sorted by distance at a time. Thus, if the sorting operation can be done at high speed, a block of small number of POIs sorted by distance (ex. several tens) is sufficient for an actual use. In case where the additional POIs are necessary, such as when a user continuously scrolls the display, the navigation system sorts and produces the sorted POIs for the next block before the previous POIs are exhausted.

Figure 1:
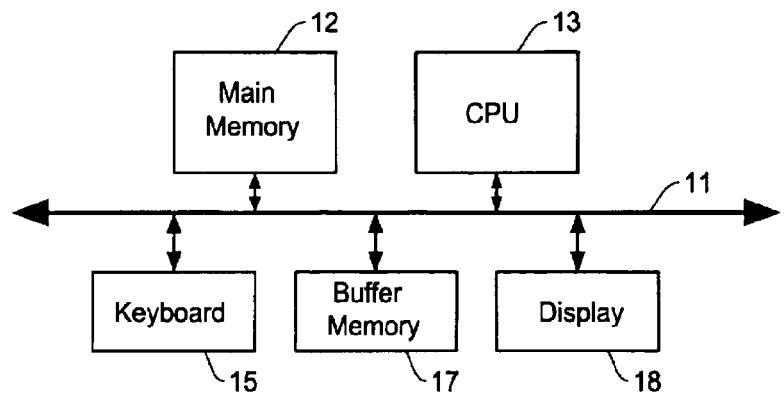
FIG. 1 is a block diagram showing a basic structure in a computer system for implementing the data sorting method of the present invention.
Figure 2A:
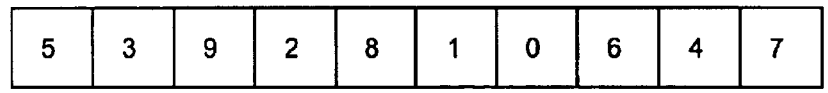
Figure 2B:
Figure 2C:
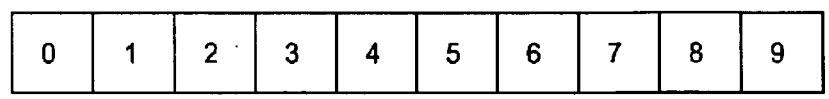

With reference to the example of FIGS. 3A–3E, the sorting method of the present invention is carried out as described below. This example shows the case where the input data with ten entries is sorted to a series of five separate blocks (FIG. 3C) where each block has two entries. The array of input data shown in FIG. 3A is the same as that of FIG. 2A. To sort the input data in the order of the number (ex. distance) shown in each element (entry) so that the sorted results of FIG. 3D (sorted in forward order) or FIG. 3E (sorted in reverse order) are produced, the sorting method first create a buffer as shown in FIG. 3B.

In this case, the buffer of FIG. 3B is constituted by a sorted buffer having spaces (entry positions) for two entries and a working buffer having spaces for two entries. If it is desired that each block of the sorted result contains three entries, each of the sorted buffer and working buffer should have spaces (entry positions) for three entries. Namely, the number of entry for each of the sorted buffer and working buffer is set to be equal to the number of entry in each block of FIG. 3C.

In the forward order of sorting, at first, a block (1) of FIG. 3C is created by the sorting process of the present invention which shows the order [0,1]. Then, the next block (2) of FIG. 3C is created which shows the order [2,3] by the sorting process of the present invention using the result of block (1). Further, the next block (3) of FIG. 3C is created which shows the order [4,5] by the sorting process of the present invention using the result of block (2). By repeating this process, the series of blocks (1)–(5) are created which form a complete sorted result as shown in FIG. 3D. If the sorting is performed in the reverse order, a complete sorted result as shown in FIG. 3E is obtained.

In such an application as sorting the POIs in the navigation system noted above, the navigation system use the sorted result as soon as one of the blocks such as the block (1) is produced. If the next sorted result is necessary, the navigation system creates the block (2) while the result in the block (1) is used. Since each block has a small number of entries, the sorting process for each block can be conducted at high speed so that the user will not recognize that the sorting operation is discontinuously performed in the navigation system.

In the sorting method of the present invention, it is assumed that a number of entries in the input data is N, a number of entries in each block is X/2, and thus, an overall number of blocks is 2N/X. And the sorting algorithm uses a buffer (sorted buffer and working buffer) of X entries, where the first X/2 entries represent the sorted buffer and the last X/2 entries represent the working buffer. In this arrangement, sorting the entries in the buffer using Quick Sort method, it requires the following number of data comparison:

Comparison (average)=$X\ln(X)$

Comparison (worst case)=$X(X-1)/2$ where ln is the natural logarithm.

Thus, when X is 60, the number of comparison is about 246 in the average case. In the worst case, the number of comparison is about 1,800.

If the input data has N entries, and to sort X entries (X+N) at a time as above, it is necessary to repeat the sorting operation by N/X times. Therefore, the number of data comparison needed for sorting N entries is:

Comparison (average)=$N/X \cdot X \ln(X)=N\ln(X)$

Comparison (worst case)=$N/X \cdot X(X-1)/2=N(X-1)/2$ where ln is the natural logarithm.

Here, when N is 1,000 and X is 60, the number of comparison is about 4,100 in the average case. In the worst case, the number of comparison is about 30,000.

As described in the foregoing, in the conventional technology, it requires 6,900 of comparison in the average case and 500,000 comparison in the worst case when N is 1,000. In the present invention, the sorted result for each block can be produced by 246 comparison and the total sorted result can be produced by 4,100 comparison in average compared to the 6,900 comparison in the conventional technology. Thus, the sorting algorithm of the present invention requires less number of comparison. Especially, in an application where the sorted result of a small block is useful, the present invention is extremely effective, since it requires very small number of comparison (ex. 246) and a small buffer memory.

In the above explanation, it is assumed that the number of entries in the sorted buffer is X/2 and the number of entries in the working buffer is X/2, i.e., the size of the sorted buffer and the working buffer are the same. However, in the present invention, the number of entries in each buffer can be different. Thus, when the number of entries in the sorted buffer is A and the number of entries in the working buffer is B, thus the entries for the overall buffer is X=A+B, a more general expression of the present invention is that the number of data entries for each block is A (same as sorted buffer) and a total number of blocks is N/(X−B) when the number of input data entries is N.

FIGS. 4A–4I show the data sorting process in the present invention for producing the sorted block (1) with two entries shown in FIG. 3C. First, a buffer is created in FIG. 4A which is configured by a sorted buffer for two entries and a working buffer for two entries, i.e., four entries in all. The shaded area of the sorted buffer is to place a reference entry to search other entry which is either smaller (in the forward order sorting) or larger (in the reverse order sorting) than the reference entry.

Figure 4A:
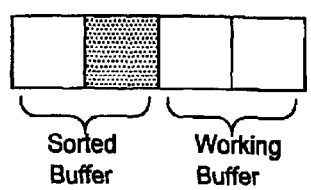
FIGS. 4A–4I are schematic diagrams showing the data sorting process in the present invention for producing a first block of sorted result.
Figure 4B:
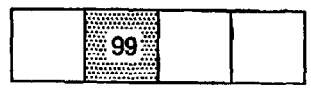
Figure 4C:
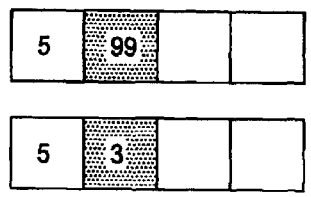

At the start, as shown in FIG. 4B, the maximum number (ex. maximum distance), larger than any anticipated entry, such as "99" is assigned to the shaded area (second space or last entry position) in the sorted buffer. In the process of FIG. 4C, data entry which is larger than "previous high" and smaller than the reference entry (entry in the shaded area) is loaded in the sorted buffer. The "previous high" means a highest entry in the previous sorting result. Because there is no previous sorting, the "previous high" is set to "−1". Since the first data "5" of the input data (FIG. 3A) is larger than "−1" and smaller than "99", it satisfies the above conditions. Thus, data entry "5" is loaded in the first space of the sorted buffer. The next data "3" also satisfies the above conditions, thus, data entry "3" is loaded in the second space of the sorted buffer.

Figure 4D:

In the next process, since the sorted buffer is full, the entries in the sorted buffer are sorted as shown in FIG. 4D. Thus, the reference entry (number in shaded area) is now changed to "5". Then, in FIG. 4E, the process similar to that of FIG. 4C is performed for the working buffer. Namely, data entry which is larger than "previous high" and smaller than the reference entry "5" is loaded in the working buffer. Since the next entry "9" of the input data (FIG. 3A) is not smaller than the reference entry "5", it does not satisfy the above conditions. The data "2" is larger than "−1" (previous high) and smaller than the reference entry "5", the data entry "2" satisfies the conditions and is loaded in the first space of the working buffer. Data entry "8" does not satisfy the conditions. However, data entry "1" satisfies the condition and is loaded in the second space of the working buffer.

Figure 4E:
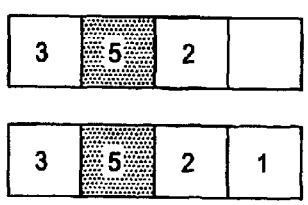
Figure 4F:
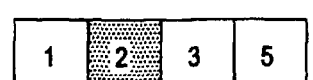
Figure 4G:
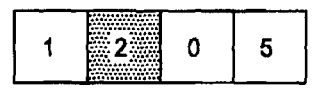
Figure 4H:
Figure 4I:
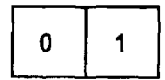

When the buffer (sorted buffer and working buffer) is full, all the entries are sorted as shown in FIG. 4F. Thus, the reference entry (number in shaded area) is now changed to "2". Then, in FIG. 4G, the process similar to that of FIG. 4E is performed for the working buffer. Namely, data entry which is larger than "−1" (previous high) and smaller than the reference entry "2" is loaded in the working buffer. Since only "0" can satisfy the conditions, data entry "0" is loaded in the first space of the working buffer. No other entries satisfy the conditions, thus, the data entry process ends. Then, all the entries are sorted in FIG. 4H. The data [0,1] of FIG. 4I in the sorted buffer is returned, thereby completing the sorted block (1) of FIG. 3C.

FIGS. 5A–5I show the data sorting process in the present invention for producing the sorted block (2) shown in FIG. 3C. First, a buffer is created in FIG. 5A which is configured by a sorted buffer for two entries and a working buffer for two entries, i.e., four entries in all. The shaded area of the sorted buffer is to place a reference entry to search other entry which is either smaller (in the forward order sorting) or larger (in the reverse order sorting) than the reference entry.

Figure 5A:
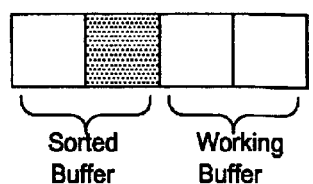
FIGS. 5A–5I are schematic diagrams showing the data sorting process in the present invention for producing a second block of sorted result.
Figure 5B:
Figure 5C:

At the start, as shown in FIG. 5B, the maximum number (ex. maximum distance), such as "99" is assigned to the shaded area (second space) in the sorted buffer. In the process of FIG. 5C, data entry which is larger than "previous high" and smaller than the reference entry (entry in the shaded area) is loaded in the sorted buffer. As result of the previous sorting process of FIGS. 4A–4I, "previous high" in this case is "1" which is the highest entry in the previous sorting result. Thus, the entries "0" and "1" do not satisfy the condition.

The data entry process starts as shown in FIG. 5C in the manner similar to the above example. Since the first data "5" in the input data (FIG. 3A) is larger than "1" (previous high) and smaller than "99", it satisfies the above conditions. Thus, data entry "5" is loaded in the first space of the sorted buffer. The next data "3" also satisfies the above conditions, thus, data entry "3" is loaded in the second space of the sorted buffer.

Figure 5D:
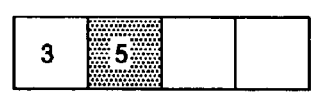

In the next process, since the sorted buffer is full, the entries in the sorted buffer are sorted as shown in FIG. 5D. Thus, the reference entry (number in shaded area) is now changed to "5". Then, in FIG. 5E, the process similar to that of FIG. 5C is performed for the working buffer. Namely, data entry which is larger than "previous high" and smaller than the reference entry "5" is loaded in the working buffer. Since the next entry "9" of the input data (FIG. 3A) is not smaller than the reference entry "5", it does not satisfy the above conditions. The data "2" is larger than "1" (previous high) and smaller than the reference entry "5", the data entry "2" satisfies the conditions and is loaded in the first space of the working buffer. Data entries "8" and "6" do not satisfy the conditions. However, data entry "4" satisfies the condition and is loaded in the second space of the working buffer.

Figure 5E:
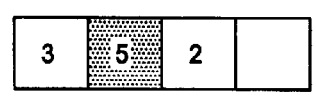
Figure 5F:
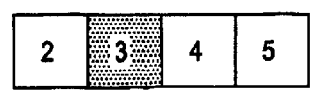
Figure 5G:
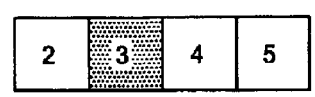
Figure 5H:
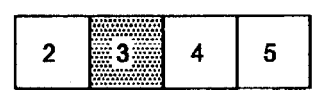
Figure 5I:
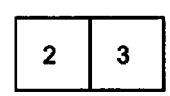

When the buffer is full, all the entries are sorted as shown in FIG. 5F. Thus, the reference entry (number in shaded area) is now changed to "3". Then, in FIG. 5G, the process similar to that of FIG. 5E is performed for the working buffer. Namely, data entry which is larger than "1" (previous high) and smaller than the reference entry "3" is loaded in the working buffer. Since there is no entry satisfies the conditions, the data entry process ends. Then, all the entries are sorted in FIG. 5H. The data [2,3] of FIG. 5I in the sorted buffer is returned, thereby completing the sorted block (2) of FIG. 3C.

FIGS. 6A–6I show the data sorting process in the present invention for producing the sorted block (3) shown in FIG. 3C. First, a buffer is created in FIG. 6A which is configured by a sorted buffer for two entries and a working buffer for two entries, i.e., four entries in all. The shaded area of the sorted buffer is to place a reference entry to search other entry which is either smaller (in the forward order sorting) or larger (in the reverse order sorting) than the reference entry.

Figure 6A:
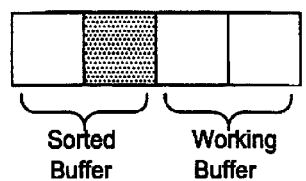
FIGS. 6A–6I are schematic diagrams showing the data sorting process in the present invention for producing a third block of sorted result.
Figure 6B:
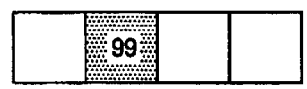
Figure 6C:
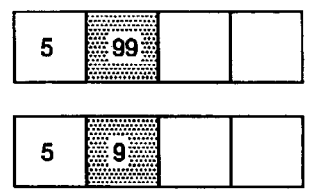

At the start, as shown in FIG. 6B, the maximum number (ex. maximum distance), such as "99" is assigned to the shaded area (second space) in the sorted buffer. In the process of FIG. 6C, data entry which is larger than "previous high" and smaller than the reference entry (entry in the shaded area) is loaded in the sorted buffer. As result of the previous sorting process of FIGS. 5A–5I, "previous high" in this case is "3" which is the highest entry in the previous sorting result. Thus, the entries "0", "1", "2" and "3" do not satisfied the condition.

The data entry process starts as shown in FIG. 6C in the manner similar to the above example. Since the first data "5" in the input data (FIG. 3A) is larger than "3" (previous high) and smaller than "99", it satisfies the above conditions. Thus, data entry "5" is loaded in the first space of the sorted buffer. The next data "9" also satisfies the above conditions, thus, data entry "9" is loaded in the second space of the sorted buffer.

Figure 6D:

In the next process, the entries in the sorted buffer are sorted as shown in FIG. 6D. Thus, the reference entry (number in shaded area) is now changed to "9". Then, in FIG. 6E, the process similar to that of FIG. 6C is performed for the working buffer. Namely, data entry which is larger than "3" (previous high) and smaller than the reference entry "9" is loaded in the working buffer. Since the next entry "8" of the input data (FIG. 3A) is larger than "3" (previous high) and smaller than the reference entry "9", it satisfies the above conditions. The data "6" is larger than "3" (previous high) and smaller than the reference entry "9", the data entry "6" is also loaded in the working buffer.

Figure 6E:
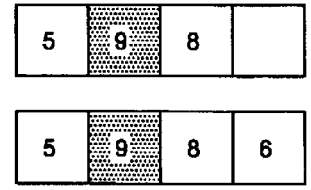
Figure 6F:
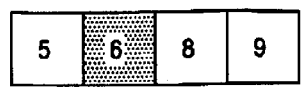
Figure 6G:
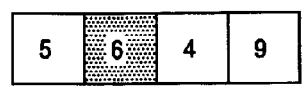
Figure 6H:
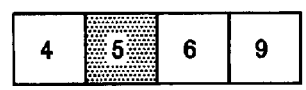
Figure 6I:
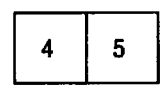

When the buffer is full, all the entries are sorted as shown in FIG. 6F. Thus, the reference entry (number in shaded area) is now changed to "6". Then, in FIG. 6G, the process similar to that of FIG. 6E is performed for the working buffer. Namely, data entry which is larger than "3" (previous high) and smaller than the reference entry "6" is loaded in the working buffer. Since "4" satisfies the conditions, data entry "4" is loaded in the first space of the working buffer. Since no other entries satisfy the conditions, the data entry process ends. Then, all the entries are sorted in FIG. 6H. The data [4,5] of FIG. 6I in the sorted buffer is returned, thereby completing the sorted block (3) of FIG. 3C.

In this manner, the sorted blocks (4) and (5) in FIG. 3C will also be produced. Consequently, the sorting method of the present invention produces the overall sorted results of FIG. 3D. Simply stated, as to each block, the above procedure is to find two smallest numbers other than the numbers already returned in the previous sorting procedures and sort the two smallest numbers in the forward order. For doing that, the entry is selected by the conditions as to whether the entry is (1) larger than the "previous high" and (2) smaller than the reference entry.

In the present invention, the data sorting in the reverse order is also possible by using the conditions opposite to the above, i.e., whether an entry is (1) smaller than a "previous low" and (2) larger than a reference entry. FIGS. 7A–7I show the data sorting process in the present invention for producing a block of sorted result where the sorting is in the reverse order as shown in FIG. 3E. In this example, it is assumed that the sorted block with entries [9,8] has been already created. Thus, the example of FIGS. 7A–7I is directed to the process for producing a sorted block with entries [7,6] in FIG. 3E.

Figure 7A:
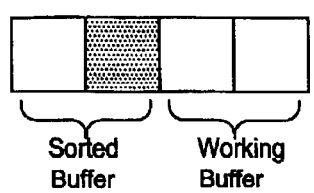
FIGS. 7A–7I are schematic diagrams showing the data sorting process in the present invention for producing a block of sorted result where the sorting is in the reverse order as shown in FIG. 3E.

First, a buffer is created in FIG. 7A which is configured by a sorted buffer for two entries and a working buffer for two entries, i.e., four entries in all. The shaded area of the sorted buffer is to place a reference entry to search other entry which is either smaller (in the forward order sorting) or larger (in the reverse order sorting) than the reference entry.

Figure 7B:
Figure 7C:
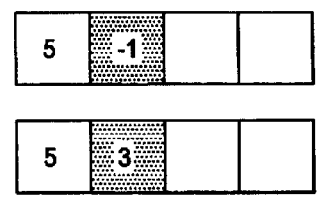

At the start, as shown in FIG. 7B, the minimum number (ex. minimum distance), which is smaller than any anticipated entries, such as "−1" is assigned to the shaded area (second space or last entry position) in the sorted buffer. In the process of FIG. 7C, data entry which is smaller than "previous low" and larger than the reference entry (entry in the shaded area) is loaded in the sorted buffer. It is assumed that as result of the previous sorting process, "previous low" in this case is "8". Thus, the entries "9", "8" do not satisfy the condition.

The data entry process starts as shown in FIG. 7C in a manner opposite to the above examples of FIGS. 4–6. Since the first data "5" in the input data (FIG. 3A) is smaller than "8" (previous low) and larger than "−1", it satisfies the above conditions. Thus, data entry "5" is loaded in the first space of the sorted buffer. The next data "3" also satisfies the above conditions, thus, data entry "3" is loaded in the second space of the sorted buffer.

Figure 7D:
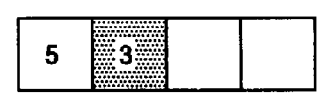

In the next process, since the sorted buffer is full, the entries in the sorted buffer are sorted in the reverse order as shown in FIG. 7D. Thus, the reference entry (number in shaded area) is now changed to "3". Then, in FIG. 7E, the process similar to that of FIG. 7C is performed for the working buffer. Namely, data entry which is smaller than "8" (previous low) and larger than the reference entry "3" is loaded in the working buffer. Since the entry "4" in the input data (FIG. 3A) is smaller than "8" (previous low) and larger than the reference entry "3", it satisfies the above conditions and is loaded in the working buffer. The data "6" is smaller than "8" (previous low) and larger than the reference entry "3", the data entry "6" satisfies the condition and is also loaded in the second space of the working buffer.

Figure 7E:
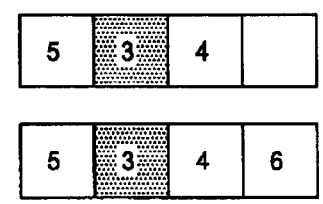
Figure 7F:
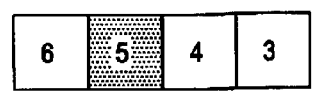
Figure 7G:
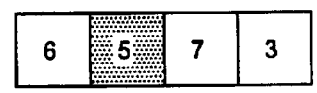
Figure 7H:
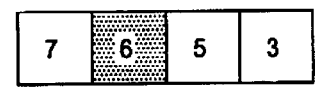
Figure 7I:
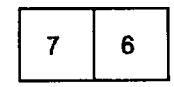

When the buffer is full, all the entries are sorted in the reverse order as shown in FIG. 7F. Thus, the reference entry (number in shaded area) is now changed to "5". Then, in FIG. 7G, the process similar to that of FIG. 7E is performed for the working buffer. Namely, data entry which is smaller than "8" (previous low) and larger than the reference entry "5" is loaded in the working buffer. Since "7" satisfies the conditions, data entry "7" is loaded in the first space of the working buffer. Since no other entries satisfy the conditions, the data entry process ends. Then, all the entries are sorted in the reverse order in FIG. 7H. The data [7,6] of FIG. 7I in the sorted buffer is returned, thereby completing the sorted block [7,6] of FIG. 3E.

As noted above, the sorting method of the present invention is advantageously applicable to a navigation system such as when sorting POI (point of interest) data by distance from a specified position. Therefore, description will be made in the following regarding the general function and structure of the navigation system and an example of implementation of the sorting method of the present invention in the navigation system.

A navigation system performs travel guidance for enabling a user to easily reach the selected destination. A typical example is a vehicle navigation system. The present invention is not limited to a vehicle navigation system but is applicable to other types of navigation system such as a PDA (Personal Data Assistant), a cellular phone, and other portable navigation devices. However, for the convenience of explanation, the following description is made mainly for the vehicle navigation system.

Such a navigation system detects the position of the vehicle, reads out map data pertaining to an area at the vehicle current position from a data storage medium, for example, a CD-ROM (compact disk read-only memory) or a DVD (digital versatile disc), and displays a map image on a monitor screen (display) while superposing a mark representing the current location of the vehicle on a predetermined portion of the map image. Alternatively, such map data can be provided to the vehicle from a remote server through a communication network such as Internet.

The vehicle position is determined by a self-contained navigation sensors (e.g. a distance traveled sensor and a bearing sensor) mounted in the vehicle or by a global positioning system (GPS) including an artificial satellite (satellite navigation). The satellite enables absolute position detection and higher position accuracy than the self-contained navigation sensors. However, the satellite navigation involves problem of position detection failure such as in a tunnel or a building where the satellite radio signals are obstructed. Therefore, recent navigation systems utilize both self-contained navigation and satellite navigation to achieve improved performances.

As the present position of the vehicle changes with the travel of the vehicle, the vehicle current position mark in the map image on the screen is changed accordingly. Alternatively, the map is scrolled while the vehicle current position mark is fixed at a predetermined position, for example, at the center of the map image. In either method, the navigation system enables the driver to recognize the map information of the area at the vehicle position at a glance.

When a destination is not set, such a navigation system functions as a locator map which indicates the current location of the vehicle on a map image. When the destination is set, the navigation system starts a route guidance function for setting a guided route from the starting point to the destination. Typically, the route guidance function performs an intersection guidance process in which a monitor screen displays an enlarged intersection diagram and the direction in which the vehicle is to travel while displaying the guide route on a map. When a destination is input, a CPU in the navigation system determines a most suitable guided route from the current vehicle position to the destination and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a driver of the desired one of roads or directions selectable at the intersection.

Figure 8A:
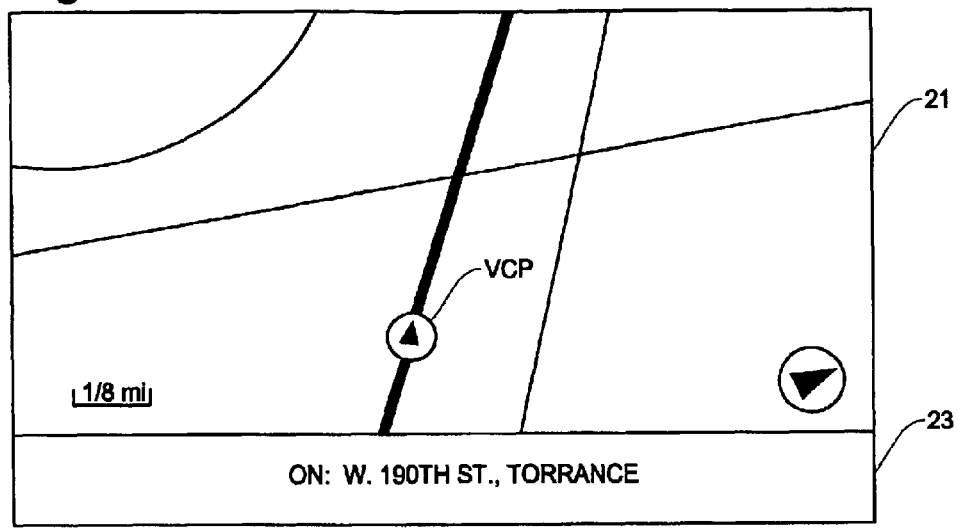
FIGS. 8A and 8B are schematic diagrams showing an example of locator map display and route guidance display, respectively, of a navigation system.

FIG. 8A shows an example of a locator map display containing a current vehicle position mark VP on a map image 21. Typically, a navigation system shows the street on which the vehicle is running in the map image 21 and a name of the street such as "W 190TH ST" in an information box 23 on the monitor screen. Other information such as a north pointer NP, a map scale and a current time may also be illustrated on the display screen. In this manner, the locator map display shows the current position of the vehicle on the map image, however, it does not perform the route guidance function because the destination is not set in the navigation system.

Figure 8B:
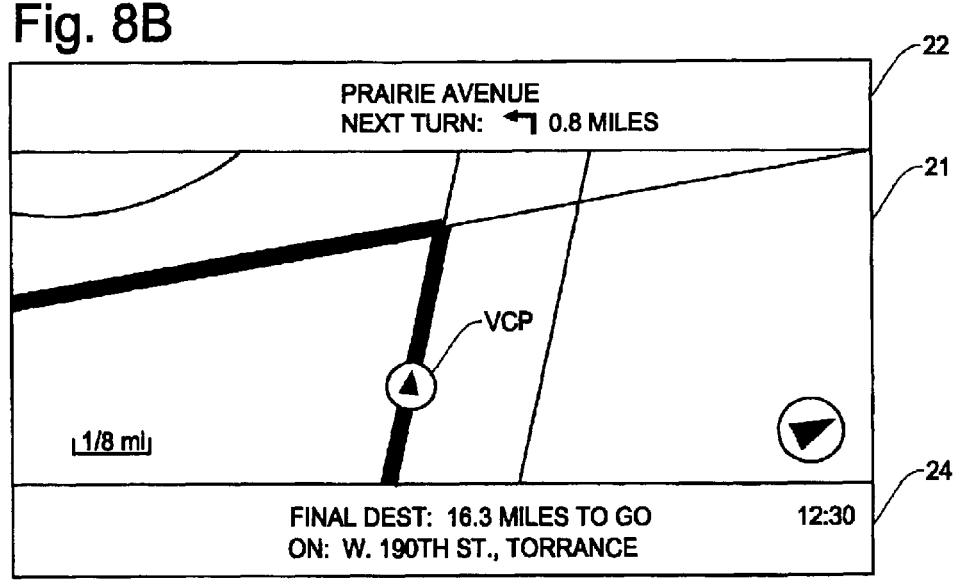

FIG. 8B shows an example of route guidance display which performs the route guidance function. The route guidance display is activated after specifying the destination. In this example, the current street "W 190TH ST" and the left side of the next street "PRAIRIE AVE" will be highlighted in the map image 21 to show the direction of turn at the next intersection. In addition, this example further shows an arrow indicating the direction (left) in which the vehicle is to turn at the intersection in a guidance information box 22 at the top of the screen. The guidance information box 22 also shows the name of the street "PRAIRIE AVE" which intersects with the current street "W 190TH ST" and a distance to the intersection. Thus, the navigation system indicates that the vehicle should make a left turn at the intersection with "PRAIRIE AVE".

Further to the highlighted display, such route guidance is accompanied by voice instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

Figure 9A:
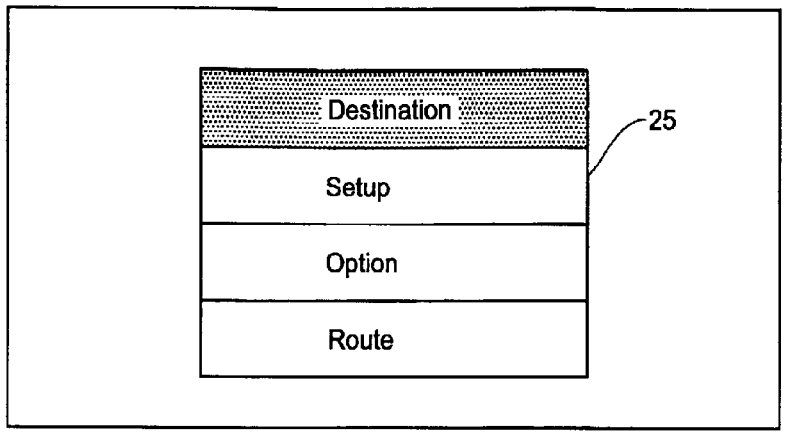
FIGS. 9A–9C are schematic diagrams showing display examples of a navigation system.
Figure 9B:
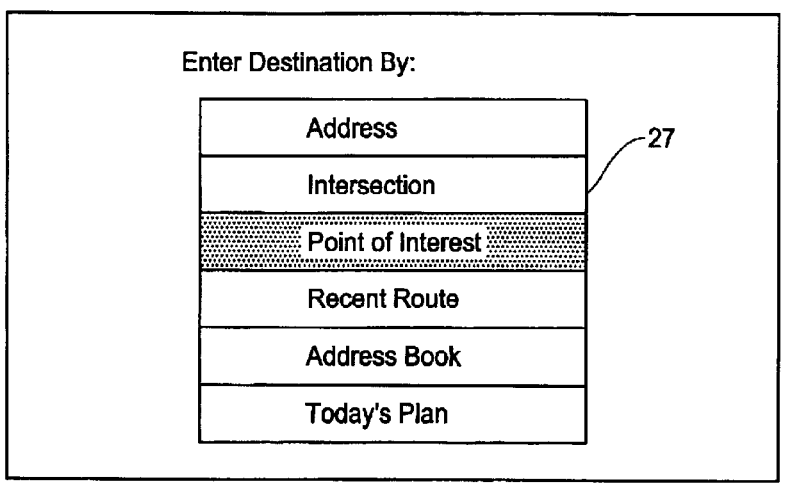
Figure 9C:
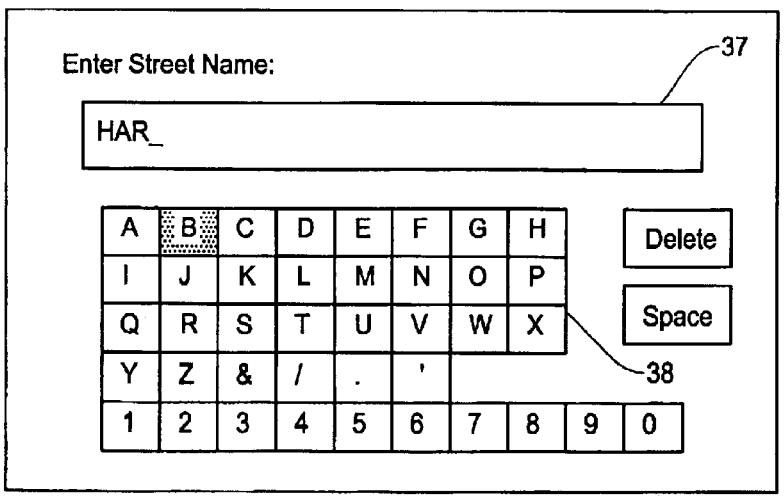

In order to be guided by the route guidance mode such as shown in FIG. 8B, a destination must be specified in the navigation system so that the system can find one or more routes to get to the destination. FIGS. 9A–9C show examples of display shown on the monitor screen during the operation of inputting the destination.

By operating a menu key, a main menu screen 25 such as shown in FIG. 9A is displayed on the navigation system and a menu item "Destination" is selected from the main menu. This allows the navigation system to display an "Enter Destination by" screen 27 as shown in FIG. 9B for specifying an input method for selecting the destination. The "Enter Destination by" screen 27 lists various methods for selecting the destination including "Address" for specifying the city and address of the destination, "Intersection" for specifying the names of two streets in the city which intersect with one another, and "Point of Interest" (POI) for selecting the programmed destination based on the name, category or telephone number.

Other methods in the "Enter Destination by" screen 27 include "Recent Route" for specifying the destination based on the recent destinations saved in the navigation system, "Address Book" for selecting the address of the destination out of the addresses stored in the system, and "Today's Plan" for specifying two or more destinations in the navigation system. For example, when a user wants to go to several destinations before the final destination, the navigation system calculates an efficient order and routes to such destinations.

When selecting, for example, the "Address" in FIG. 9B, the navigation system displays an "Enter Street Name" screen such as shown in FIG. 9C. The screen of FIG. 9C is basically a key board 38 for inputting the city and address in an address input box 37 on the monitor screen. The user inputs the street name and number in the address input box 37 through the key board 38.

After inputting the destination, the navigation system determines a route to the destination based on, for example, the shortest way to reach the destination, the route using many freeways as possible or the route without using toll road, and the like. Thus, the navigation system moves to the route guidance display such as shown in FIG. 8B which performs the route guidance.

This invention is directed to a method and apparatus for a navigation system using the input method of "Point of Interest" noted above. Typically, a specific category of point of interest (POI) information is searched and displayed based on an order of distance from a current user position. Although the "Point of Interest (POI)" input method is convenient and useful, because the recent storage medium provides a large volume of data showing POI information, it requires a large memory and a relatively long time for extracting and processing the POI information to display the POI information sorted by distance.

An example of process for specifying a destination through the "Point of Interest" is carried out in the following manner with reference to FIGS. 10A–10F. In the example of FIGS. 10A–10F, it is assumed that an intended destination is a Japanese restaurant "Taiko" in Irvine, Calif. FIG. 10A shows an example of screen listing the various input methods noted above for selecting the destination. As shown in this example, typically, the navigation display lists several items, such as up to seven or eight items per page as a maximum number. Therefore, when the number of items exceeds the maximum number, it is usually necessary to scroll the display to see the other items outside of the current screen.

In FIG. 10A, by selecting the "Point of Interest" and hitting an enter key, the navigation system displays a screen shown in FIG. 10B for finding the point of interest by either place names or place types. As shown in this example, this screen typically lists only two items. In FIG. 10B, by selecting the "Place Type" and pressing the enter key, the navigation system displays a screen shown in FIG. 10C for selecting the categories of the point of interest. This screen lists various different categories of point of interest such as "ATM", "Automotive", "Bank", "Restaurant", "Hotel", "Shopping" and others. Typically, the number of such categories are as many as forty or more. Therefore, in many cases, such a category list must be scrolled to find a favorite place type on the screen.

By selecting the category type "Restaurant" in FIG. 10C, the navigation system displays another category select screen listing sub-categories of the selected category. In this case, the sub-category screen shows types of food such as "American", "Californian", "Chinese", "French", "Italian", "Japanese", "Korean" and etc. Sometimes, such a sub-category list extends to several pages, requiring page scrolling to find a favorite sub-category.

By selecting the sub-category "Japanese" and pressing the enter key in FIG. 10D, the navigation system displays a screen for selecting a method of finding the places as shown in FIG. 10E. In this example, the methods include "Sort by Distance", "Name" and "Within a city". The "Sort by Distance" method is to find the places, Japanese restaurants, in this case, in the order of distance from the vehicle current position. The "Name" method is to find the places by inputting the name of the Japanese restaurant through, for example, a key board. The "Within a City" method is to allow a user to select a city name and then to list the places, i.e., Japanese restaurants.

By selecting the "Sort by Distance" and hitting the enter key in FIG. 10E, the navigation system displays a list of Japanese restaurants in the order of distance from the current vehicle position as shown in FIG. 10F. The screen of FIG. 10F is to select one of the place names in the list. Typically, the list also includes a distance from the current vehicle position and a direction from the current vehicle position for each place name in the list. In the case where two or more restaurants having the same name exist, such restaurants will be listed in the order of the distance from the vehicle position.

The user selects the name "Taiko" in FIG. 10F and presses the enter key. Then, the navigation system displays a confirmation route screen such as shown in FIG. 10G for confirming the destination. The screen of FIG. 10G shows the name, address and phone number of the selected destination. Although not shown in the example of FIG. 10G, such a confirmation screen may also show the distance to the destination, an anticipated time length to reach the destination, and the direction to the destination.

By selecting "OK to Proceed" in FIG. 10G, the navigation system calculates the optimum route to the destination in FIG. 10H. The navigation system determines the route to the destination based on, for example, the shortest way to reach the destination, the route using many freeways as possible or the route without using toll road, and the like. During this process, the navigation system shows a progress of calculation by a bar graph as shown in the lower part of FIG. 10H. Then, the navigation system moves to the route guidance display such as shown in FIG. 8B which performs the route guidance.

In the foregoing example, the process of specifying the destination by the "Point of Interest" (POI) requires a step of searching (extracting) the specified POI information (ex. Japanese restaurant) for an area as large as an entire country. The process further requires a step of sorting the acquired POI information to display in the order of distance from a particular position such as a current vehicle (user) position.

Before going into details of the data sorting method of the present invention applied to the navigation system, a brief description is made regarding the basic structure of the navigation system. In the block diagram of FIG. 11, the navigation system includes a map storage medium 41 such as a CD-ROM, DVD, hard disc or other storage means (hereafter "DVD") for storing map information, a DVD control unit 42 for controlling an operation for reading the map information from the DVD, a position measuring device 43 for measuring the present vehicle position. The position measuring device 43 has a vehicle speed sensor for detecting a moving distance, a gyroscope for detecting a moving direction, a microprocessor for calculating a position, a GPS receiver, and etc.

Figure 11:
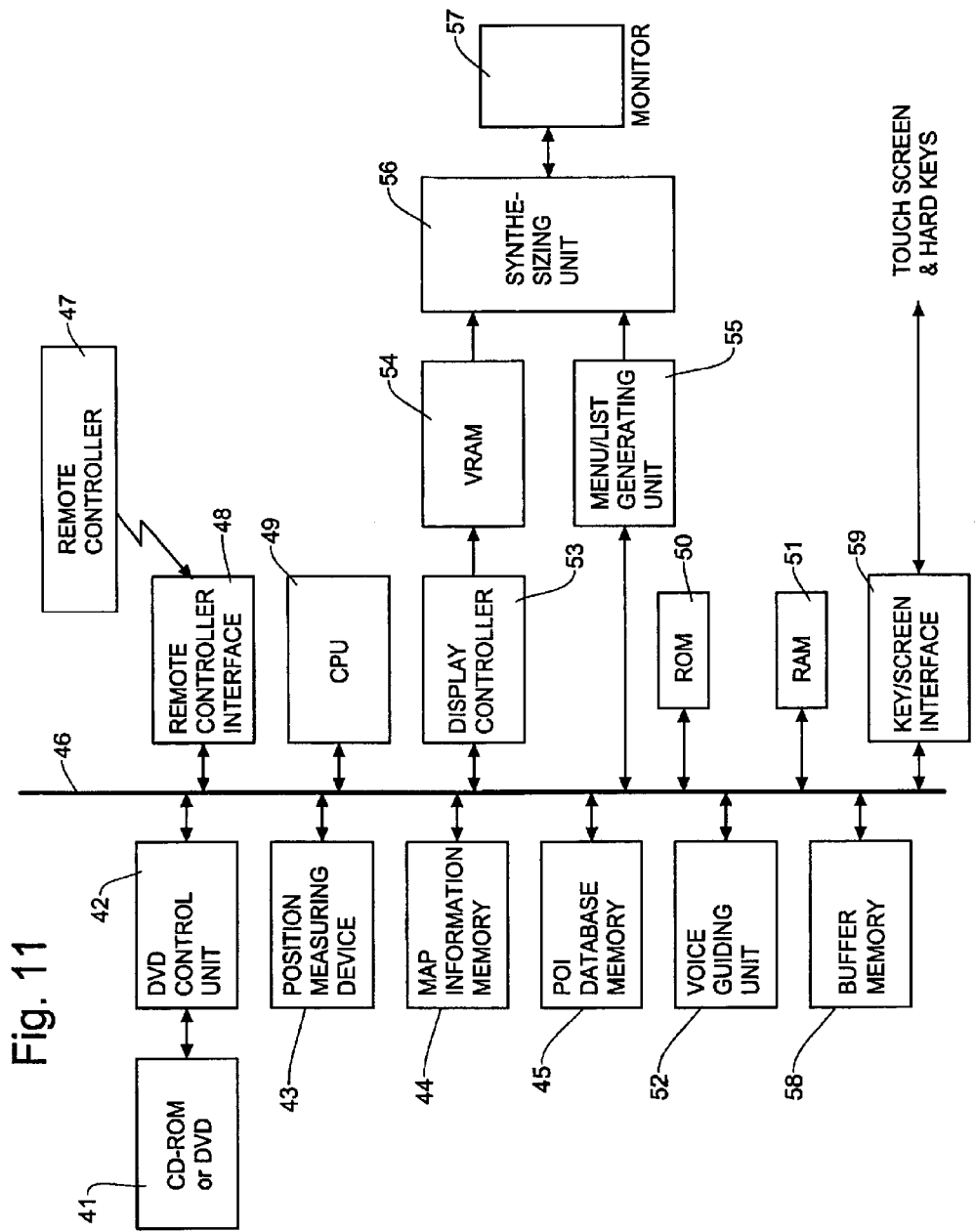
FIG. 11 is a block diagram showing an example of structure in the vehicle navigation system according to the present invention.

The block diagram of FIG. 11 further includes a map information memory 44 for storing the map information which is read out from the DVD 41, a database memory 45 for storing database information such as point of interest (POI) information which is read out from the DVD 41, a remote controller 47 for executing a menu selection operation, an enlarge/reduce operation, a destination input operation, etc. and a remote controller interface 48.

Figure 12A:
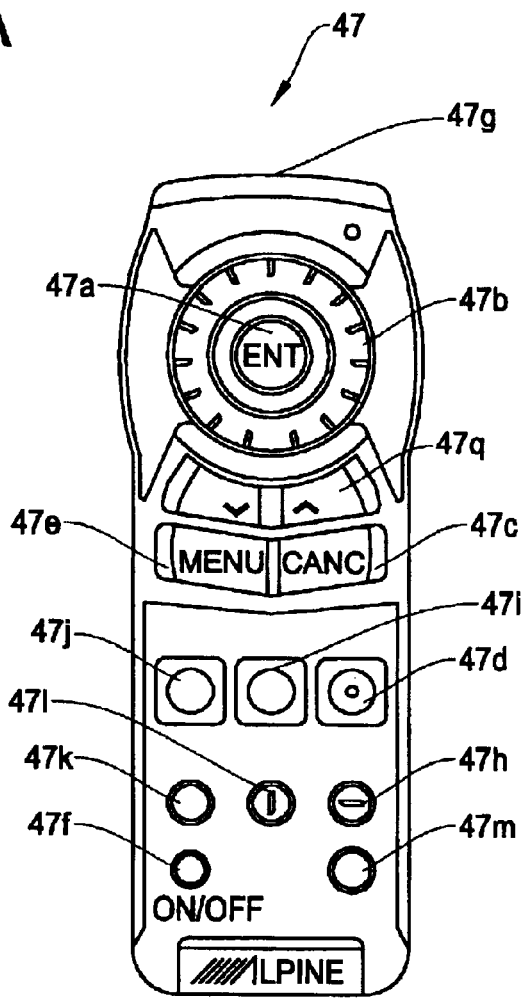
FIGS. 12A and 12B are diagrams showing an example of a remote controller accompanied by the vehicle navigation system of the present invention.
Figure 12B:
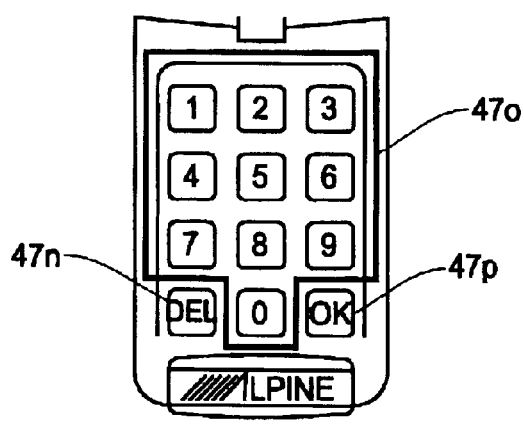

The remote controller 47 has a variety of function keys as shown in FIG. 12A and numeric keys as shown in FIG. 12B. The numeric keys appear when a lid in the lower part of FIG. 12A is opened. The remote controller 47 includes a joystick/enter key 47a, a rotary encoder 47b, a cancel key 47c, an MP/RG key 47d, a menu key 47e, a zoom/scroll key 47q, a monitor ON/OFF key 47f, a remote control transmitter 47g, a plan key 47h, an N/H key 47i, a voice key 47j, a list key 47k, a detour key 47l, a delete destination key 47m, a delete key 47n, numeric keys 47o, and an OK key 47p.

The joystick/enter key 47a selects highlighted items within the menu and moves map displays and a vehicle position icon. The rotary encoder 47b changes zoom scale, scrolls list pages, moves the cursor, and etc. The cancel key 47c cancels the present displayed screen or is operated when returning the screen to the previous menu screen. The MP/RG key 47d toggles between detailed map display and basic guide display during guidance. The menu key 47e displays the main menu. The plan key 47h starts the guidance to the route set by Today's Plan function, the N/H key 47i changes between North-up and Heading-up orientation, and the voice key 47j initiates voice instruction.

Although a remote controller such as described above is a typical example for selecting menus, executing selected functions and etc., the navigation system usually includes various other input methods to achieve the same and similar operations done through the remote controller. For example, the navigation system includes hard keys and a joystick on a head unit of the navigation system mounted on a dash board, touch screen of the display panel, and voice communication means.

Referring back to FIG. 11, the navigation system further includes a bus 46 for interfacing the above units in the system, a processor (CPU) 49 for controlling an overall operation of the navigation system, a ROM 50 for storing various control programs such as a route search program and a map matching program necessary for navigation control, a RAM 51 for storing a processing result such as a guide route, a voice interface and guiding unit 52 for voice communication interface and spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, a monitor (display) 57, a buffer memory 58 for temporarily storing data for calculating and adjusting an order of display of the POI information, and a key and screen interface 59 for interfacing with various other input means such as hard keys and joystick on a display panel of the navigation system or a touch screen of the navigation system, and the like.

As noted above, in a typical application, a user instructs the navigation system to display a list of POIs (points of interest) sorted by distance for selecting a destination. Usually, a display screen of the navigation system lists several to ten items (POIs) on the screen. If the user want see other POIs, the user scrolls the display screen by operating the scroll key 47q (FIG. 12A).

The data sorting method of the present invention is advantageously applied to such operations of the navigation system in sorting and scrolling the POIs. FIGS. 13A–13L shows a process for sorting the POIs by distance in the forward order (from the shortest to the longest) with use of the sorting method of the present invention. It should be noted that the application of the sorting method to the navigation system is not limited to sort the POIs but can be applicable to sort other data such as cells covering a predetermined area in a matrix manner.

Figure 13A:

FIG. 13A shows an array of POI data which is extracted from a map data source such as a DVD 41 (FIG. 11). An upper box (1) shows identification of POI and a lower box (2) shows a distance of the POI. In this example, it is assumed that the POI data array is sorted to produce a plurality of small blocks having sorted POI data as shown in FIGS. 13L and 14B. For simplicity of explanation, the POI data array has only 16 entries and each block has only three entries (POIs). However, in an actual application, larger number of entries (POIs), such as 1,000 entries in the input data and such as 30 entries in each block (FIG. 13L) are processed.

Figure 13B:
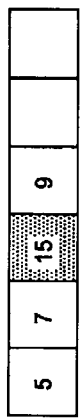
Figure 13C:
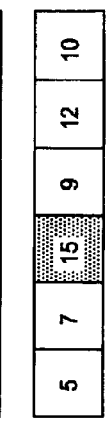

In sorting the POIs, first, a buffer is created in FIG. 13B which is configured by a sorted buffer for three entries and a working buffer for three entries, i.e., six entries in all. The shaded area of the sorted buffer is to place a reference entry to search other entry which is either smaller (in the forward order sorting) or larger (in the reverse order sorting) than the reference entry.

Figure 13D:
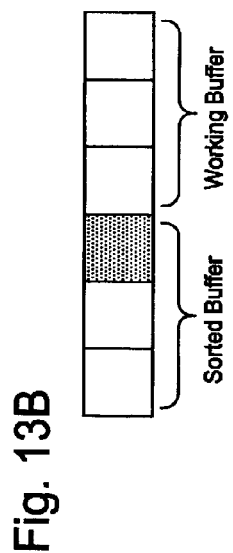

At the start, as shown in FIG. 13B, the maximum number (ex. maximum distance), a value larger than any anticipated entry such as "99" is assigned to the shaded area (third space) in the sorted buffer. In the process of FIG. 13D, data entry which is larger than "previous high" and smaller than the reference entry (entry in the shaded area) is loaded in the sorted buffer. The "previous high" means a highest entry in the previous sorting result. Because there is no previous sorting, the "previous high" is set to "−1". It should be noted that the values of the maximum number (or minimum number in reverse sorting) and the previous high (or previous low in reverse sorting) can be freely selected depending on the specific purpose.

Since POI (A) in the input data (FIG. 13A) has distance data "15" which is larger than "−1" and smaller than "99", it satisfies the above conditions. Thus, the distance data "15" of POI (A) is loaded in the first space of the sorted buffer. Distance data "7" of POI (B) and distance data "5" of POI (C) also satisfy the above conditions. Thus, in FIG. 13D, the distance data "7" and "5" are also loaded respectively in the second and third spaces of the sorted buffer.

Figure 13E:
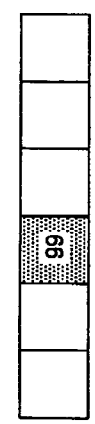

In the next process, since the sorted buffer is full, the entries in the sorted buffer are sorted as shown in FIG. 13E. Thus, the reference entry (number in shaded area) is now changed to "15". Then, in FIG. 13F, distance data which is larger than "previous high" and smaller than the reference entry "15" is searched and loaded in the working buffer. Since the next distance data "9" of POI (D) in the input data (FIG. 13A) is larger than the "−1" (previous high) and smaller than the reference entry "15", it satisfies the above conditions. Thus, the distance data "9" is loaded in the first space of the working buffer. Similarly, distance data "12" of POI (E) and distance data "10" of POI (F) also satisfy the above conditions. Thus, in FIG. 13F, the distance data "12" and "10" are also loaded respectively in the second and third spaces of the working buffer.

Figure 13F:
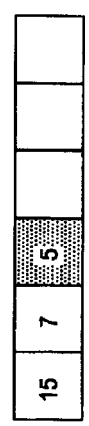
Figures 13G, 13H, 13I, 13J, 13K, 13L:
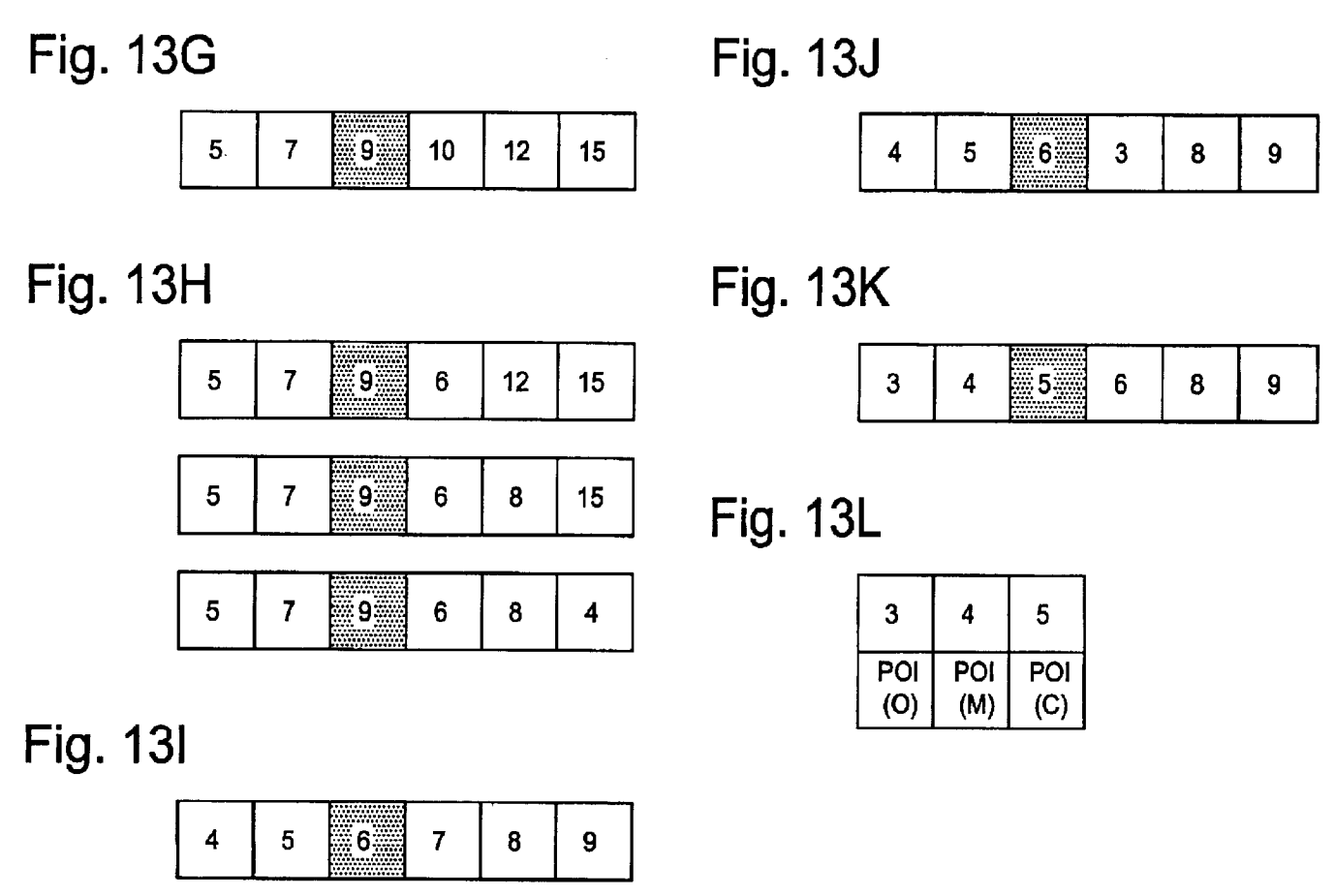

Since the buffer is full, all the entries (distance data) are sorted in the forward order as shown in FIG. 13G. Thus, the reference entry (number in shaded area) is now changed to "9". Then, in FIG. 13H, the process similar to that of FIG. 13F is performed for the working buffer. Namely, distance data which is larger than "−1" (previous high) and smaller than the reference entry "9" is loaded in the working buffer.

Since distance data "6" of POI (G) in the input data (FIG. 13A) is larger than the "−1" (previous high) and smaller than the reference entry "9", it satisfies the above conditions. Thus, the distance data "6" is loaded in the first space of the working buffer. Similarly, distance data "8" of POI (H) satisfies the conditions and is loaded in the second space of the working buffer in FIG. 13H. Further, distance data "4" of POI (M) satisfies the conditions and is loaded in the third space of the working buffer as shown in FIG. 13H.

Since the buffer is full, all the entries (distance data) are sorted in the forward order as shown in FIG. 13I. Thus, the reference entry (number in shaded area) is now changed to "6". Then, in FIG. 13J, the process similar to that of FIG. 13H is performed for the working buffer. Namely, distance data which is larger than "−1" (previous high) and smaller than the reference entry "6" is loaded in the working buffer.

Distance data "3" of POI (O) is larger than the "−1" (previous high) and smaller than the reference entry "6", it satisfies the above conditions. Thus, the distance data "3" is loaded in the first space of the working buffer. No other entries satisfy the above conditions, thus, the data entry process ends. Then, all the entries in the buffer of FIG. 13J are sorted in the forward order, resulting in the order of distance shown in FIG. 13K. The distance data [3,4,5], i.e, POI (O), POI (M) and POI (C) in the sorted buffer are returned, thereby completing the sorted block of FIG. 13L.

By repeating this procedure for the next block while renewing the "previous high" by the highest number (longest distance) in the block resulted from the immediately prior sorting process, the navigation system can complete all the blocks of sorted results. FIG. 14A and FIGS. 14B–14F show side-by-side comparison between the original POI data and the blocks of sorted results. The block of FIG. 14B shows the sorted result derived from the procedures of FIGS. 13B–13L described above. Each of the blocks of FIGS. 14C–14F is produced by repeating the procedures of FIGS. 13B–13L although the "previous high" has to be replaced with the highest number in the immediately prior block. For example, for producing the sorting result of FIG. 14D, the "previous high" must be "8" in the block of FIG. 14C.

Although not shown here, the reverse order sorting can also be performed in a manner described above while using opposite relationship regarding the conditions. Namely, as described in FIGS. 7A–7I, in the reverse order sorting, the conditions for selecting the data entry are whether the entry is (1) smaller than "previous low" and (2) larger than reference entry. Therefore, in the navigation system, it is possible to sort the POIs by distance in the reverse order, which is useful for scrolling back the list of POIs on the display screen.

Figure 15A:
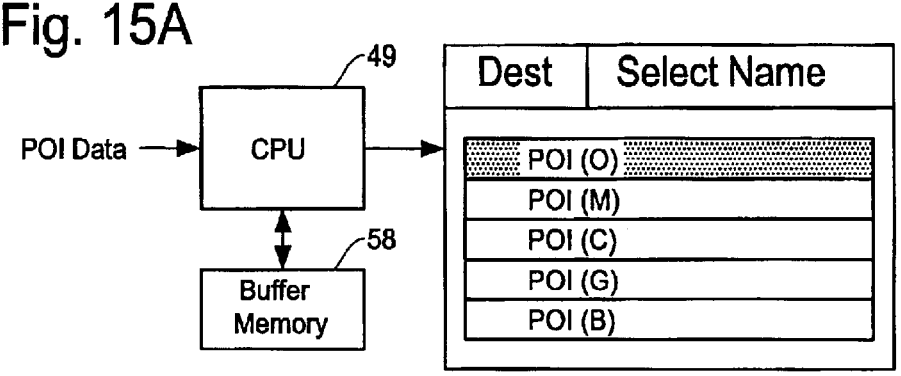
FIGS. 15A–15C are schematic diagrams showing a basic configuration of the navigation system for implementing the sorting method of the present invention and display examples when scrolling the POI information sorted by distance in accordance with the present invention.
Figure 15B:
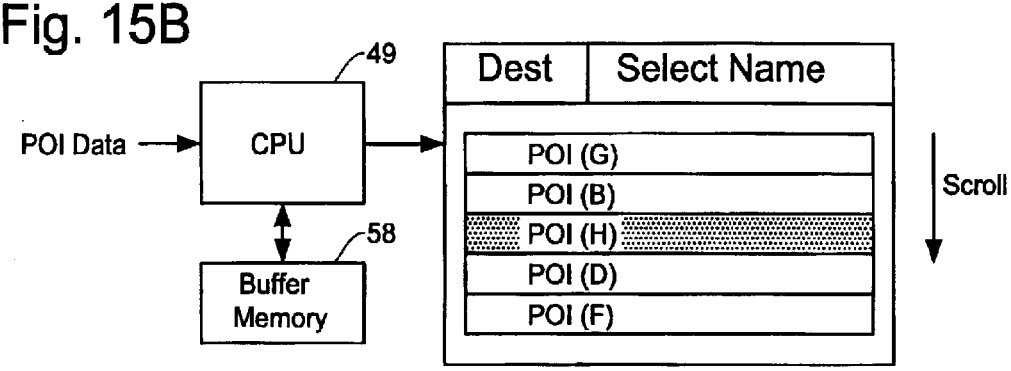
Figure 15C:
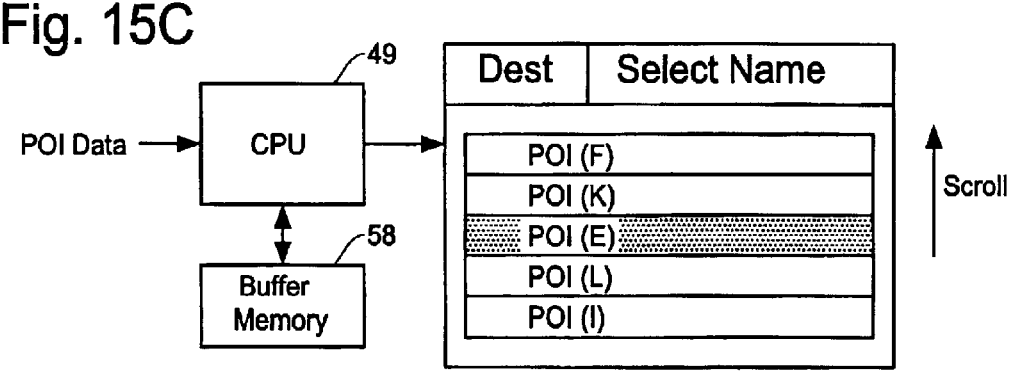

FIGS. 15A–15C are schematic diagrams showing a basic configuration of the navigation system for implementing the sorting method of the present invention and display examples when scrolling the POI information sorted by distance in accordance with the present invention. Through the sorting procedures of the present invention described above, the navigation system displays POIs sorted by distance. In this example, the CPU 49 and the buffer memory 58 of FIG. 11 are shown for conducting the sorting procedures for the input POI data and displaying the list of POIs sorted by distance.

The navigation system (CPU 49) retrieves the POIs from the data source such as DVD or CD ROM 41 (FIG. 11) and sorts them by distance. The number of POIs can be as many as 1,000, however, in the present invention, such POIs are sorted separately in a plurality of blocks each having a small number of POIs. For example, each block includes 30 POIs sorted by distance which can be sufficient for initial display since, in practice, one display screen displays 5–10 POIs. Thus, in the present invention, as soon as the first block of sorted POIs is obtained, the navigation system displays the list of sorted POIs sorted by distance as shown in FIG. 15A.

When a user scrolls the screen by operating, for example, the scroll key 47q (FIG. 12A), as in FIG. 15B, the navigation system shows the POIs in the downward list continuously. When the user further scrolls down, and the sorted POIs in the block will be exhausted, the navigation system continuously produces the next block of sorted POIs. When the user scrolls in the upward direction, as shown in FIG. 15C, and the navigation system has to produce another block of sorted POIs, the navigation system performs the sorting in the reverse order to display the POIs sorted by distance in the upward list.

Figure 16:
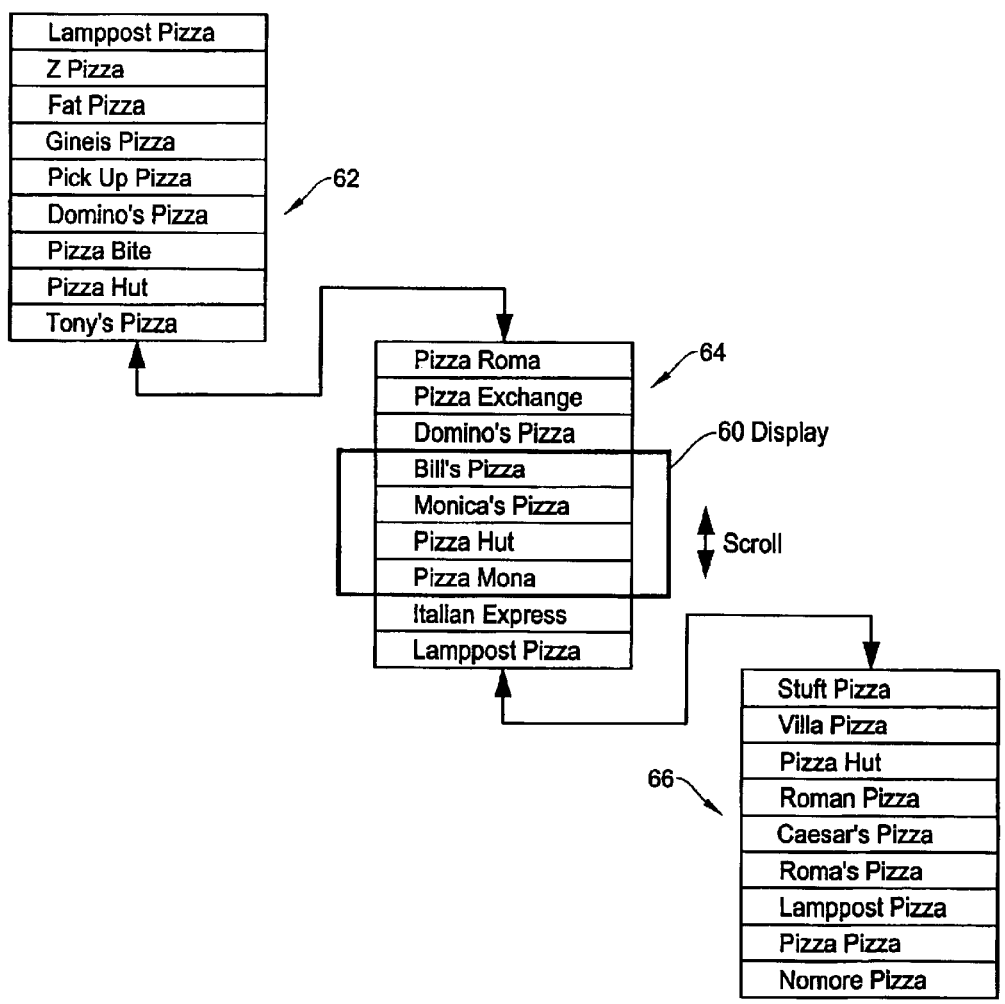
FIG. 16 is a schematic diagram showing the concept of the present invention for displaying the POI information sorted by distance where a block of sorted result is produced sequentially when required by the actual use of the navigation system.

FIG. 16 is a schematic diagram showing the situation similar to that of FIGS. 15A–15C for displaying the POI information sorted by distance where a block of sorted result is produced sequentially when required by the actual use of the navigation system. Each of blocks 62, 64 and 66 carries the sorted POIs and is produced sequentially by the sorting method of the present invention. The navigation system lists the POIs of specified category such as "Pizza" on a display 60. The POIs in each block is sorted by distance from, for example, a current user position.

When the user scrolls the display up and down, the POIs on the display 60 change accordingly. If the range of scroll is within the block such as the block 64, the navigation system simply displays the POIs in the block 64. If the scroll exceeds the current block 64, the navigation system produces either the block 62 or 66 depending on the direction of scroll. For the downward scroll, the navigation system produces blocks of POIs sorted in the forward order, and for the upward scroll, the navigation system produces blocks of POIs sorted in the reverse order as described above.

Figure 17:
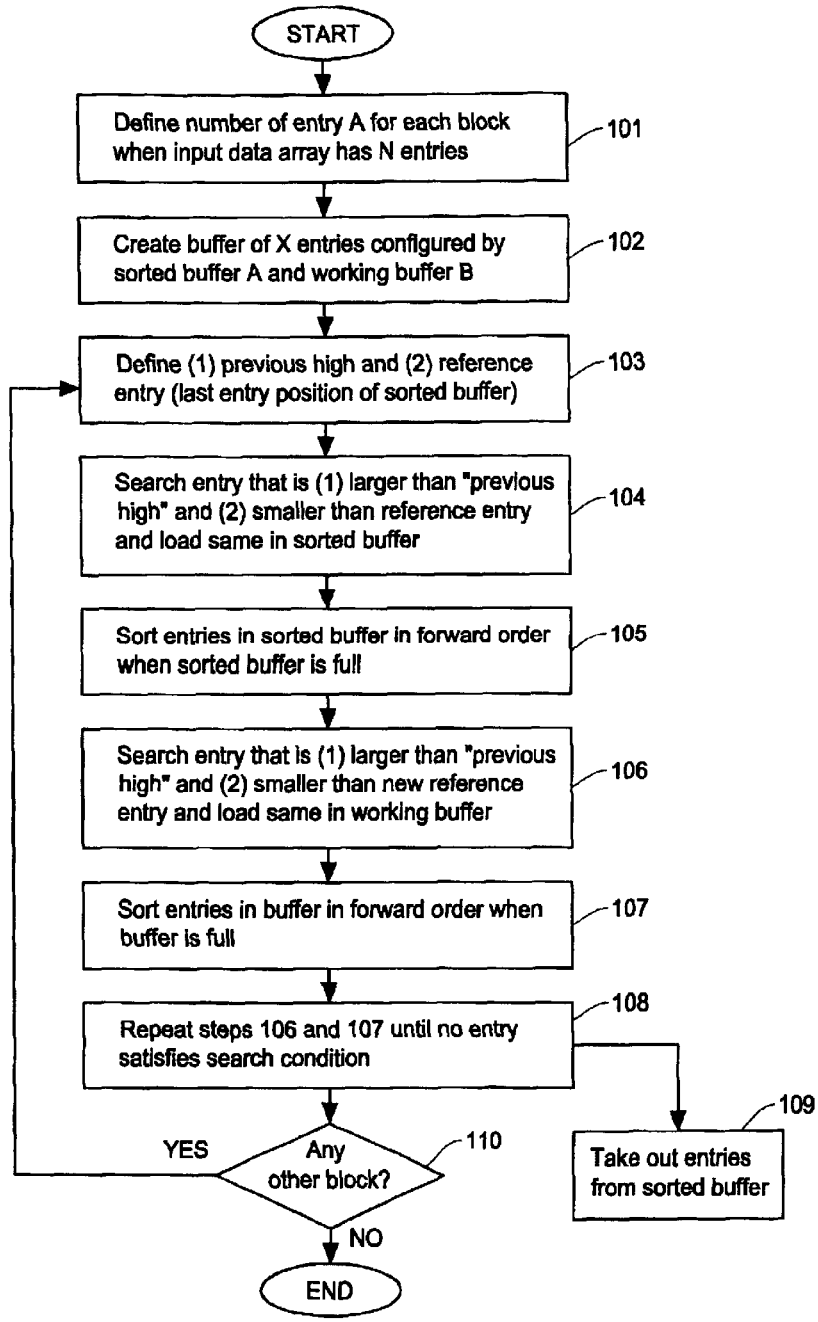
FIG. 17 is a flow chart showing the sorting procedure of the present invention for sorting the input data in a forward order.

FIG. 17 is a flow chart showing the sorting procedure of the present invention for sorting the input data in a forward order. As noted above, in the data sorting method of the present invention, an array of input data is sorted in the specified order in the form of a plurality of blocks. In the flow chart of FIG. 17, the forward order sorting is conducted as follows:

At step 101, the sorting method defines a number of data entries A for each block when the input data array has N entries and a total number of blocks is N/(X−B), where X is smaller than N. Then, in step 102, the method creates a buffer of X entries configured by a series of a sorted buffer of A entry positions and a working buffer of B entry positions, i.e., X=A+B. Further, in step 103, the sorting method defines "previous high" and a reference entry where the previous high is the highest value in the block of sorted entries obtained in the immediately previous sorting process and the reference entry is a value in the last entry position of the sorted buffer.

At step 104, the sorting method of the present invention searches an entry that satisfies conditions of (1) larger than the previous high and (2) smaller than the reference entry and load the entry that satisfies the conditions in the sorted buffer. As noted above with reference to FIGS. 4A–4I, an initial value of the reference entry in the step 104 is a maximum value larger than any entry in the input data array.

Then, in step 105, the sorting method sorts the entries in the sorted buffer in the forward order when the sorted buffer is full. Because of this sorting of the entries in the sorted buffer, the value of the entry in the last entry position of the sorted buffer changes, i.e, the reference entry is changed to a new reference entry. At step 106, the method searches an entry that satisfies conditions of (1) larger than the previous high and (2) smaller than the new reference entry and load the entry that satisfies the conditions in the working buffer.

In step 107, the method sorts the entries in the overall buffer (sorted buffer and the working buffer) in the forward order when the buffer is full. In step 108, the steps 106 and 107 are repeated until no entry in the data array satisfies the conditions in the step 106. When there is no entry that satisfies this condition, at step 109, the sorting method takes the entries in the sorted buffer to complete a block of sorted entries A.

The above procedure is to produce one block of entries sorted in the forward order. For producing all of the blocks of sorted entries, at step 110, it is determined whether any other blocks exists. If there is no remaining block, the sorting process ends. If there is other block, the process goes back to the step 103 and repeats the procedures of steps 103–109 until all the blocks of sorted entries are produced.

Figure 18:
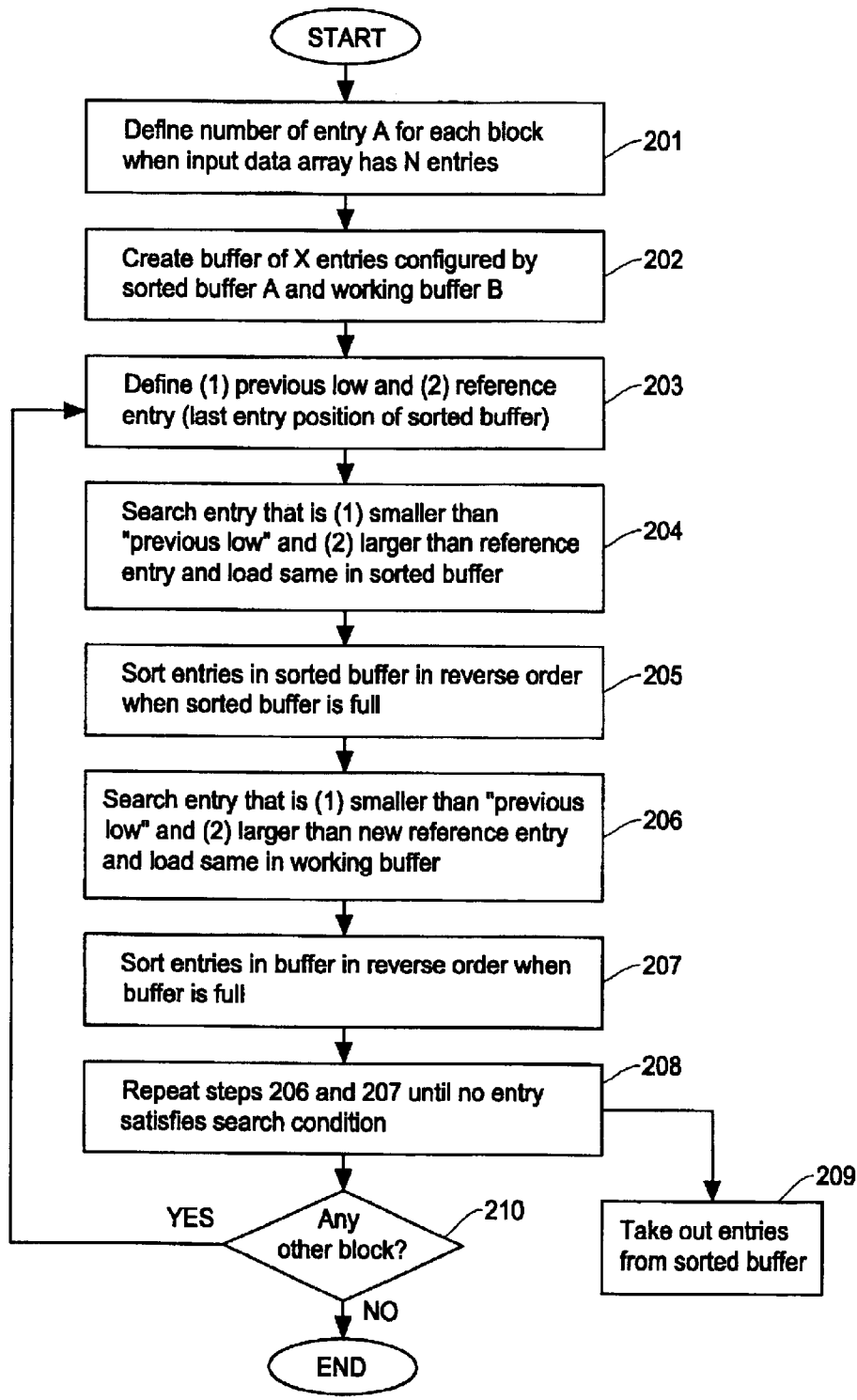
FIG. 18 is a flow chart showing the sorting procedure of the present invention for sorting the input data in a reverse order.

FIG. 18 is a flow chart showing the sorting procedure of the present invention for sorting the input data in a reverse order. As noted above, in the data sorting method of the present invention, an array of input data is sorted in the specified order in the form of a plurality of blocks. In the flow chart of FIG. 18, the reverse order sorting is conducted as follows:

At step 201, the sorting method defines a number of data entries A for each block when the input data array has N entries and a total number of blocks is N/(X−B), where X is smaller than N. Then, in step 202, the method creates a buffer of X entries configured by a series of a sorted buffer of A entry positions and a working buffer of B entry positions, i.e., X=A+B. Further, in step 203, the sorting method defines "previous low" and a reference entry where the previous low is the lowest value in the block of sorted entries obtained in the immediately previous sorting process and the reference entry is a value in the last entry position of the sorted buffer.

At step 204, the sorting method of the present invention searches an entry that satisfies conditions of (1) smaller than the previous low and (2) larger than the reference entry and load the entry that satisfies the conditions in the sorted buffer. As noted above with reference to FIGS. 7A–7I, an initial value of the reference entry in the step 204 is a minimum value smaller than any entry in the input data array.

Then, in step 205, the sorting method sorts the entries in the sorted buffer in the reverse order when the sorted buffer is full. Because of this sorting of the entries in the sorted buffer, the value of the entry in the last entry position of the sorted buffer changes, i.e, the reference entry is changed to a new reference entry. At step 206, the method searches an entry that satisfies conditions of (1) smaller than the previous low and (2) larger than the new reference entry and load the entry that satisfies the conditions in the working buffer.

In step 207, the method sorts the entries in the overall buffer (sorted buffer and the working buffer) in the reverse order when the buffer is full. In step 208, the steps 206 and 207 are repeated until no entry in the data array satisfies the conditions in the step 206. When there is no entry that satisfies this condition, at step 209, the sorting method takes the entries in the sorted buffer to complete a block of sorted entries A.

The above procedure is to produce one block of entries sorted in the reverse order. For producing all of the blocks of sorted entries, at step 210, it is determined whether any other blocks exists. If there is no remaining block, the sorting process ends. If there is other block, the process goes back to the step 203 and repeats the procedures of steps 203–209 until all the blocks of sorted entries are produced.

As described in the foregoing, according to the present invention, the data sorting method can dramatically reduce the sorting time and the memory size for sorting the array of input data. Each block having the sorted data therein is produced continuously until all blocks of sorted data are produced. The navigation method and system utilizes the sorting method of the present invention thereby enabling to produce one or more blocks of small amount of POIs sorted by distance which is immediately necessary for a practical use of the navigation system. Accordingly, the navigation method and system is able to quickly sort and display the POI information without requiring a large memory or a high power computer. When it is really necessary, the navigation method and system repeats the sorting operations to produce the next block of sorted POIs. Therefore, the present invention can provide a navigation system with high speed operation and low cost.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A computer-implemented navigation method for displaying point of interest (POI) information for selecting a destination, comprising the following steps of:

specifying a category of POI in a navigation system for displaying a list of specified POIs;

collecting a predetermined number (N) of POIs in an input data array;

defining a number A of POIs to be contained in each block to produce a series of blocks each having the sorted POIs, where X is smaller than N, and a total number of blocks is N/(X−B);

sorting the POIs by distance from a predetermined position in a forward order or a reverse order to produce a block of POIs sorted by distance where each block has A of POIs;

displaying a list of POIs using the block of POIs sorted by distance and scrolling the list of POIs on a display screen in response to a scroll request; and repeating the above steps of sorting the POIs and displaying the POIs to produce another block of sorted POIs when the sorted POIs from previous sorting become insufficient for a further scroll request.

2. A computer-implemented navigation method as defined in claim 1, wherein said step of sorting the POIs in the forward order is comprised of the following steps of:

(a) creating a buffer of X=A+B entries configured by a series of a sorted buffer of A entry positions and a working buffer of B entry positions;

(b) defining "previous high" and a reference entry where the previous high is a largest distance value in a block of sorted POIs obtained in an immediately previous sorting and the reference entry is a distance value in a last entry position of the sorted buffer;

(c) searching a POI that satisfies conditions of (1) larger than the previous high and (2) smaller than the reference entry and loading the POI that satisfies the conditions in the sorted buffer;

(d) sorting the POIs in the sorted buffer in a forward order when the sorted buffer is full;

(e) searching a POI that satisfies conditions of (1) larger than the previous high and (2) smaller than a new reference entry and loading the POI that satisfies the conditions in the working buffer;

(f) sorting the POIs in the buffer in the forward order when the buffer is full;

(g) repeating the above steps (e)–(f) until no POI satisfies the conditions in the step (f); and (h) producing a block of sorted POIs by taking the A POIs from the sorted buffer.

3. A computer-implemented navigation method as defined in claim 2, further comprising a step of determining whether all the blocks of sorted POIs are produced, and if not, repeating the steps (b)–(h) until all the blocks of sorted POIs are produced.

4. A computer-implemented navigation method as defined in claim 2, wherein said new reference entry is a distance value in the last entry position of the sorted buffer after the sorting step (d) or the sorting step (f), thereby collecting a POI of a smallest distance value from the input data array.

5. A computer-implemented navigation method as defined in claim 2, wherein an initial value of said reference entry in the step (b) is a maximum distance value larger than any POI in the input data array.

6. A computer-implemented A navigation method as defined in claim 1, wherein said step of sorting the POIs in the reverse order is comprised of the following steps of:
 (a) creating a buffer of X=A+B entries configured by a series of a sorted buffer of A entry positions and a working buffer of B entry positions;
 (b) defining "previous low" and a reference entry where the previous low is a smallest distance value in a block of sorted POIs obtained in an immediately previous sorting and the reference entry is a distance value in a last entry position of the sorted buffer;
 (c) searching a POI that satisfies conditions of (1) smaller than the previous low and (2) larger than the reference entry and loading the POI that satisfies the conditions in the sorted buffer;
 (d) sorting the POIs in the sorted buffer in a reverse order when the sorted buffer is full;
 (e) searching a POI that satisfies conditions of (1) smaller than the previous low and (2) larger than a new reference entry and loading the POI that satisfies the conditions in the working buffer;
 (f) sorting the POIs in the buffer in the reverse order when the buffer is full;
 (g) repeating the above steps (e)–(f) until no POI satisfies the conditions in the step (e); and
 (h) producing a block of sorted POIs by taking the A POIs from the sorted buffer.

7. A computer-implemented navigation method as defined in claim 6, further comprising a step of determining whether all the blocks of sorted POIs are produced, and if not, repeating the steps (b)–(h) until all the blocks of sorted POIs are produced.

8. A computer-implemented navigation method as defined in claim 6, wherein said new reference entry is a distance value in the last entry position of the sorted buffer after the sorting step (d) or the sorting step (f), thereby collecting a POI of a largest distance value from the input data array.

9. A computer-implemented navigation method as defined in claim 6, wherein an initial value of said reference entry in the step (b) is a minimum distance value smaller than any POI in the input data array.

10. A computer-implemented data sorting method for sorting an array of input data in a specified order to a plurality of blocks, comprising the following steps of:
 (a) defining a number of data entries A for each block when the input data array has N entries and a total number of blocks is N/(X−B), where X is smaller than N;
 (b) creating a buffer of X=A+B entries configured by a series of a sorted buffer of A entry positions and a working buffer of B entry positions;
 (c) defining "previous high" and a reference entry where the previous high is a highest value in a block of sorted entries obtained in an immediately previous sorting and the reference entry is a value in a last entry position of the sorted buffer;
 (d) searching an entry that satisfies conditions of (1) larger than the previous high and (2) smaller than the reference entry and loading the entry that satisfies the conditions in the sorted buffer;
 (e) sorting the entries in the sorted buffer in a forward order when the sorted buffer is full;
 (f) searching an entry that satisfies conditions of (1) larger than the previous high and (2) smaller than a new reference entry and loading the entry that satisfies the conditions in the working buffer;
 (g) sorting the entries in the buffer in the forward order when the buffer is full;
 (h) repeating the above steps (f)–(g) until no entry satisfies the conditions in the step (f); and
 (i) producing a block of sorted entries by taking the entries A from the sorted buffer.

11. A computer-implemented data sorting method as defined in claim 10, further comprising a step of determining whether all the blocks of sorted entries are produced, and if not, repeating the steps (c)–(i) until all the blocks of sorted entries are produced.

12. A computer-implemented data sorting method as defined in claim 10, wherein said new reference entry is a value in the last entry position of the sorted buffer after the sorting step (e) or the sorting step (g), thereby collecting an entry of a smallest value from the input data array.

13. A computer-implemented data sorting method as defined in claim 10, wherein an initial value of said reference entry in the step (c) is a maximum value larger than any entry in the input data array.

14. A computer-implemented data sorting method for sorting an array of input data in a specified order to a plurality of blocks, comprising the following steps of:
 (a) defining a number of data entries A for each block when the input data array has N entries and a total number of blocks is 2N/(X−B), where X is smaller than N;
 (b) creating a buffer of X=A+B entries configured by a series of a sorted buffer of A entry positions and a working buffer of B entry positions;
 (c) defining "previous low" and a reference entry where the previous low is a lowest value in a block of sorted entries obtained in an immediately previous sorting and the reference entry is a value in a last entry position of the sorted buffer;
 (d) searching an entry that satisfies conditions of (1) smaller than the previous low and (2) larger than the reference entry and loading the entry that satisfies the conditions in the sorted buffer;
 (e) sorting the entries in the sorted buffer in a reverse order when the sorted buffer is full;
 (f) searching an entry that satisfies conditions of (1) smaller than the previous low and (2) larger than a new reference entry and loading the entry that satisfies the conditions in the working buffer;
 (g) sorting the entries in the buffer in the reverse order when the buffer is full;
 (h) repeating the above steps (f)–(g) until no entry satisfies the conditions in the step (f); and
 (i) producing a block of sorted entries by taking the entries A from the sorted buffer.

15. A computer-implemented data sorting method as defined in claim 14, further comprising a step of determining whether all the blocks of sorted entries are produced, and if not, repeating the steps (c)–(i) until all the blocks of sorted entries are produced.

16. A computer-implemented data sorting method as defined in claim 14, wherein said new reference entry is a value in the last entry position of the sorted buffer after the sorting step (e) or the sorting step (g), thereby collecting an entry of a largest value from the input data array.

17. A computer-implemented data sorting method as defined in claim 14, wherein an initial value of said reference entry in the step (c) is a minimum value smaller than any entry in the input data array.

18. A computer-implemented navigation system for displaying point of interest (POI) information for selecting a destination, comprising:

means for specifying a category of POI in a navigation system for displaying a list of specified POIs;

means for collecting a predetermined number (N) of POIs in an input data array;

means for defining a number A of POIs to be contained in each block to produce a series of blocks each having the sorted POIs, where X is smaller than N, and a total number of blocks is N/(X−B);

means for sorting the POIs by distance from a predetermined position in a forward order or a reverse order to produce a block of POIs sorted by distance where each block has A of POIs;

means for displaying a list of POIs using the block of POIs sorted by distance and scrolling the list of POIs on a display screen in response to a scroll request; and means for repeating the above procedure of sorting the POIs and displaying the POIs to produce another block of sorted POIs when the sorted POIs from previous sorting become insufficient for a further scroll request.

19. A computer-implemented navigation system as defined in claim 18, wherein said means for sorting the POIs in the forward order performs the following steps of:

(a) creating a buffer of X=A+B entries configured by a series of a sorted buffer of A entry positions and a working buffer of B entry positions;

(b) defining "previous high" and a reference entry where the previous high is a largest distance value in a block of sorted POIs obtained in an immediately previous sorting and the reference entry is a distance value in a last entry position of the sorted buffer;

(c) searching a POI that satisfies conditions of (1) larger than the previous high and (2) smaller than the reference entry and loading the POI that satisfies the conditions in the sorted buffer;

(d) sorting the POIs in the sorted buffer in a forward order when the sorted buffer is full;

(e) searching a POI that satisfies conditions of (1) larger than the previous high and (2) smaller than a new reference entry and loading the POI that satisfies the conditions in the working buffer;

(f) sorting the POIs in the buffer in the forward order when the buffer is full;

(g) repeating the above steps (e)–(f) until no POI satisfies the conditions in the step (f); and (h) producing a block of sorted POIs by taking the A POIs from the sorted buffer.

20. A computer-implemented navigation system as defined in claim 18, wherein said means for sorting the POIs in the reverse order performs the following steps of:

(a) creating a buffer of X=A+B entries configured by a series of a sorted buffer of A entry positions and a working buffer of B entry positions;

(b) defining "previous low" and a reference entry where the previous low is a smallest distance value in a block of sorted POIs obtained in an immediately previous sorting and the reference entry is a distance value in a last entry position of the sorted buffer;

(c) searching a POI that satisfies conditions of (1) smaller than the previous low and (2) larger than the reference entry and loading the POI that satisfies the conditions in the sorted buffer;

(d) sorting the POIs in the sorted buffer in a reverse order when the sorted buffer is full;

(e) searching a POI that satisfies conditions of (1) smaller than the previous low and (2) larger than a new reference entry and loading the POI that satisfies the conditions in the working buffer;

(f) sorting the POIs in the buffer in the reverse order when the buffer is full;

(g) repeating the above steps (e)–(f) until no POI satisfies the conditions in the step (e); and (h) producing a block of sorted POI by taking the A POIs from the sorted buffer.

* * * * *